(12) United States Patent
Morinaga et al.

(10) Patent No.: US 8,023,163 B2
(45) Date of Patent: Sep. 20, 2011

(54) IMAGE READING AND RECORDING APPARATUS

(75) Inventors: Kazuyuki Morinaga, Kawasaki (JP);
Hideaki Nagahara, Yokohama (JP);
Yoshiaki Suzuki, Nagareyama (JP);
Naohiro Iwata, Yokohama (JP);
Hideyuki Terashima, Kawasaki (JP);
Akihiro Tomoda, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 819 days.

(21) Appl. No.: 11/945,798

(22) Filed: Nov. 27, 2007

(65) Prior Publication Data
US 2008/0158622 A1    Jul. 3, 2008

(30) Foreign Application Priority Data
Dec. 28, 2006 (JP) ................... 2006-353971

(51) Int. Cl.
*H04N 1/04* (2006.01)
(52) U.S. Cl. ........ 358/498; 358/474; 358/496; 358/400; 271/109; 271/9.11; 271/9.01
(58) Field of Classification Search .................. 358/498, 358/474, 496, 400, 497; 271/109, 226, 121, 271/9.13, 9.11, 9.07, 9.01
See application file for complete search history.

(56) References Cited

U.S. PATENT DOCUMENTS

| | | | | |
|---|---|---|---|---|
| 5,726,692 A * | 3/1998 | Yamaguchi et al. | ............. | 347/23 |
| 5,751,301 A * | 5/1998 | Saikawa et al. | ................... | 347/8 |
| 6,183,151 B1 * | 2/2001 | Kono | ........................... | 400/582 |
| 6,631,975 B2 * | 10/2003 | Fukasawa et al. | .............. | 347/33 |
| 7,077,517 B2 * | 7/2006 | Awai et al. | ..................... | 347/104 |
| 7,192,207 B2 * | 3/2007 | Ohashi et al. | ................. | 400/188 |
| 7,438,383 B2 * | 10/2008 | Ikeda | ............................... | 347/33 |
| 7,506,944 B2 * | 3/2009 | Umeda | ............................. | 347/7 |
| 7,651,084 B2 * | 1/2010 | Kobayashi | .................... | 271/127 |
| 2004/0036756 A1 * | 2/2004 | Nakano et al. | ............... | 347/104 |
| 2004/0179045 A1 * | 9/2004 | Awai et al. | ........................ | 347/1 |
| 2007/0046721 A1 * | 3/2007 | Miyazawa | ....................... | 347/29 |
| 2008/0158288 A1 * | 7/2008 | Nagahara et al. | .............. | 347/30 |
| 2009/0014944 A1 * | 1/2009 | Kobayashi | .................... | 271/118 |
| 2010/0061743 A1 * | 3/2010 | Uematsu | ......................... | 399/38 |
| 2010/0110140 A1 * | 5/2010 | Iwakura | .......................... | 347/37 |
| 2010/0165039 A1 * | 7/2010 | Tanaka et al. | .................... | 347/30 |

FOREIGN PATENT DOCUMENTS

JP    2005-354453    12/2005

* cited by examiner

*Primary Examiner* — Negussie Worku
(74) *Attorney, Agent, or Firm* — Canon USA Inc IP Division

(57) ABSTRACT

An image reading and recording apparatus includes a trigger arm configured to start transmission of a drive to a paper feed unit in accordance with the position of a carriage. The trigger arm includes a first lever portion for feeding a recording sheet in a state in which a cap is separated from a recording head and a second lever portion for feeding a document in a state in which the cap is in contact with the recording head.

14 Claims, 18 Drawing Sheets

IMAGE READING AND RECORDING APPARATUS

BACKGROUND OF THE INVENTION

1. Field of the Invention

The present invention relates to an image reading and recording apparatus including a recording head that records an image on a recording sheet and a reading unit that reads an image of a document.

2. Description of the Related Art

Typical recording apparatuses record an image (including characters and symbols) on a recording medium, such as a sheet of paper, a cloth, a plastic sheet, and an overhead transparency, (hereinafter, referred to as a recording sheet) based on recording information. Recording apparatuses can be classified into the ink jet type, the wire dot type, the thermal type, and the laser beam type, depending on their recording processes.

A serial recording apparatus, which records information while main-scanning a recording sheet in a direction orthogonal to the direction of conveying the recording sheet, records an image using a recording head mounted on a carriage moving along the recording sheet. The serial recording apparatus completes recording on the entire recording sheet by repeating a recording operation for a line, a paper feeding operation by a predetermined amount after the completion of the recording operation, and a next recording operation for the next line. In contrast, a line recording apparatus, which records information by only sub-scanning a recording sheet in the direction of conveying the recording sheet, completes recording on the entire sheet by repeating a set operation of setting a recording sheet at a predetermined record position, a recording operation of recording an entire line at a time, a paper feeding operation by a predetermined amount, and a next recording operation of recording a next entire line at a time.

An image reading and recording apparatus including a recording unit that records an image on a fed recording sheet and a reading unit that reads a fed document is used. Japanese Patent Laid-Open No. 2005-354453 discloses an image reading and recording apparatus that includes a common unit used as both a paper feed unit and a conveying unit for a recording sheet and a document to reduce costs and size. This patent document discloses a technique for being able to feed a recording sheet and a document when a carriage is in a predetermined position using the ink jet recording process of recording information by discharging ink droplets from a recording head mounted on the carriage.

Unfortunately, for the image reading and recording apparatus described in this patent document, the carriage is at rest in the same position both when a recording sheet is fed and when a document is fed. In addition, because this image reading and recording apparatus uses the ink jet recording process, the recording head is capped in a standby state by a cap disposed at a position for maintenance of the recording head. The recording apparatus having this structure feeds a sheet of paper in a state in which the cap is separated from the recording head (in a cap-open state). The recording apparatus having this structure is also in a cap-open state during a document feeding operation, when a recording operation is not performed. As a result, maintenance operations, such as discharging of ink from the recording head or cleaning of the recording head by wiping after such a feeding operation, are needed.

In the image reading and recording apparatus described in the patent document, a discharge recovering portion (maintenance portion) is driven using a reverse drive of a conveying motor. For such an image reading and recording apparatus, even when the recording head is capped immediately after the completion of a paper feeding operation, a suction pump of the discharge recovering portion is actuated simultaneously with a reverse rotation of a conveying roller to locate the beginning of a document or for other purposes during a document feeding operation. This may inadvertently apply a negative pressure to an ink discharging portion of the recording head.

One approach to avoiding such a disadvantage is to repeat maintaining the cap-open state until a paper feeding operation or an operation of locating the beginning of a document is completed for each page. However, for this approach, ink in an opened discharge port is apt to be dried and fixed.

SUMMARY OF THE INVENTION

The present invention provides an image reading and recording apparatus capable of switching a recording operation and a reading operation in a short time without a reduction in throughput and waste of ink caused by a recovery operation for a recording head.

According to a first aspect of the present invention, an image reading and recording apparatus includes a carriage configured to move a recording head mounted thereon, a reading unit, a paper feed unit, a conveying roller, a motor, a cap, and a paper-feed starting member. The recording head discharges ink onto a recording sheet to record information. The reading unit is configured to read an image of a document. The paper feed unit is configured to feed a recording sheet or a document. The conveying roller is configured to convey a recording sheet or a document. The motor is configured to drive the conveying roller. The cap contacts with or separates from the recording head mounted on the carriage in accordance with movement of the carriage. The paper-feed starting member is configured to transmit a drive of the motor to the paper feed unit in accordance with movement of the carriage. The paper-feed starting member includes a first lever portion and a second lever portion. The first lever portion triggers feeding a recording sheet when being engaged with the carriage in a state in which the recording head and the cap are separated from each other. The second lever portion triggers feeding a document when being engaged with the carriage in a state in which the recording head and the cap are in contact with each other.

According to a second aspect of the present invention, an image reading and recording apparatus includes a carriage configured to move a recording head mounted thereon, a reading unit, a paper feed unit, a conveying roller, a motor, a cap, a paper-feed starting member, a first abutment portion, and a second abutment portion. The recording head discharges ink onto a recording sheet to record information. The reading unit is configured to read an image of a document. The paper feed unit is configured to feed a recording sheet or a document. The conveying roller is configured to convey a recording sheet or a document. The motor is configured to drive the conveying roller. The cap contacts with or separates from the recording head mounted on the carriage in accordance with movement of the carriage. The paper-feed starting member is configured to transmit a drive of the motor to the paper feed unit in accordance with movement of the carriage. The first abutment portion is configured to obtain position information of the carriage when being contacted by the carriage in a state in which the recording head and the cap are separated from each other. The second abutment portion is configured to obtain position information of the carriage when being contacted by the carriage in a state in which the recording head and the cap are in contact with each other.

Further features of the present invention will become apparent from the following description of exemplary embodiments (with reference to the attached drawings).

BRIEF DESCRIPTION OF THE DRAWINGS

FIG. 9A illustrates a state in which the drive to the paper feed unit is interrupted, and FIG. 9B illustrates a state in which the drive is transmittable to the paper feed unit.

FIG. 13A is a perspective view of a drive transmission mechanism with the carriage indicated with dashed lines, and FIG. 13B is a frontal view that illustrates the carriage and its surroundings.

FIG. 14A is a perspective view of the drive transmission mechanism with the carriage indicated with dashed lines, and FIG. 14B is a frontal view that illustrates the carriage and its surroundings.

FIG. 15A is a perspective view of the drive transmission mechanism with the carriage indicated with dashed lines, and FIG. 15B is a frontal view that illustrates the carriage and its surroundings.

FIG. 16A is a perspective view of the drive transmission mechanism with the carriage indicated with dashed lines, and FIG. 16B is a frontal view that illustrates the carriage and its surroundings.

FIG. 17A is a perspective view of the drive transmission mechanism with the carriage indicated with dashed lines, and FIG. 17B is a frontal view that illustrates the carriage and its surroundings.

DESCRIPTION OF THE EMBODIMENTS

Figure 1:
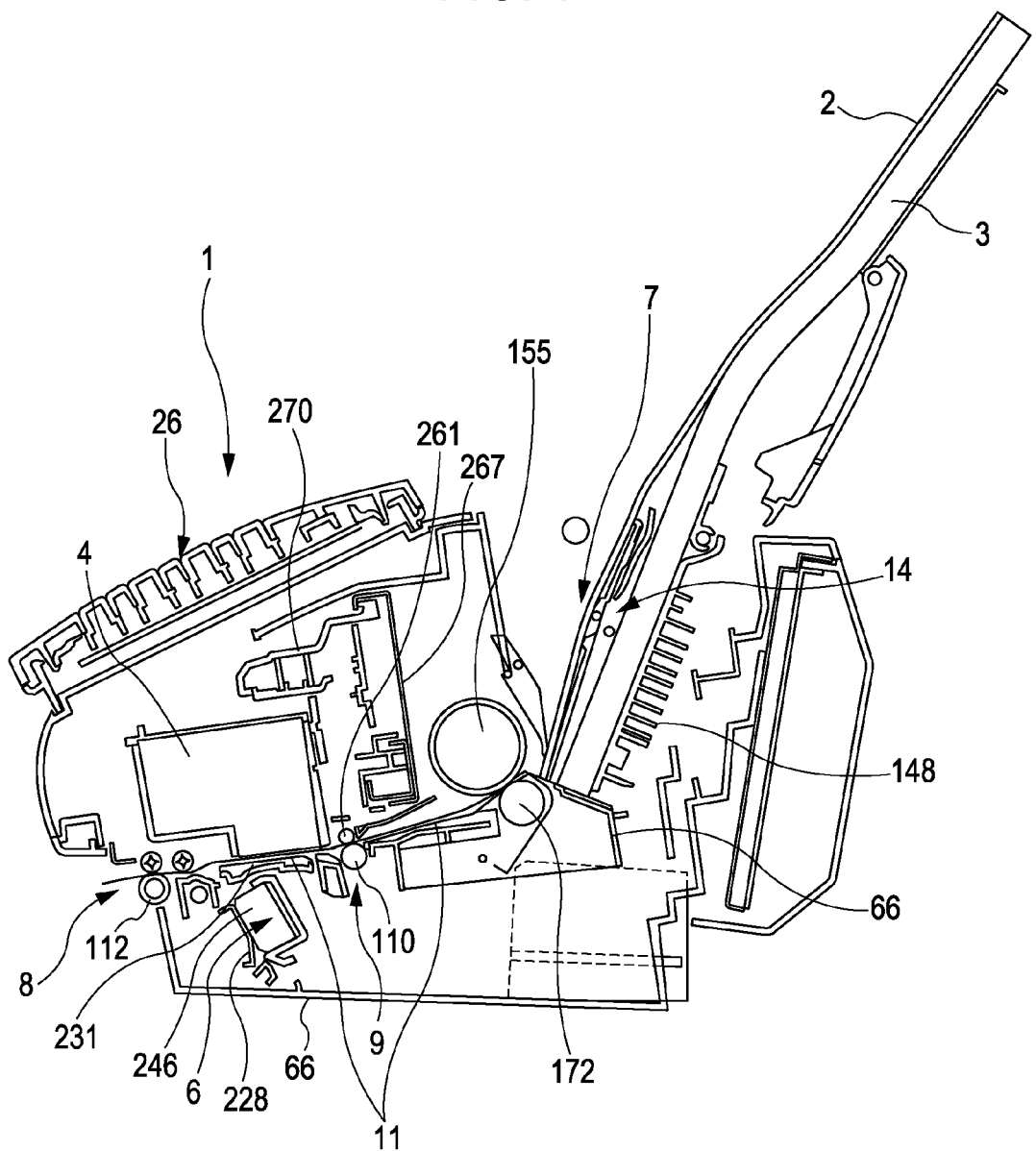
FIG. 1 is a vertical section that illustrates a general structure of an image reading and recording apparatus according to an embodiment of the present invention.
Figure 2:
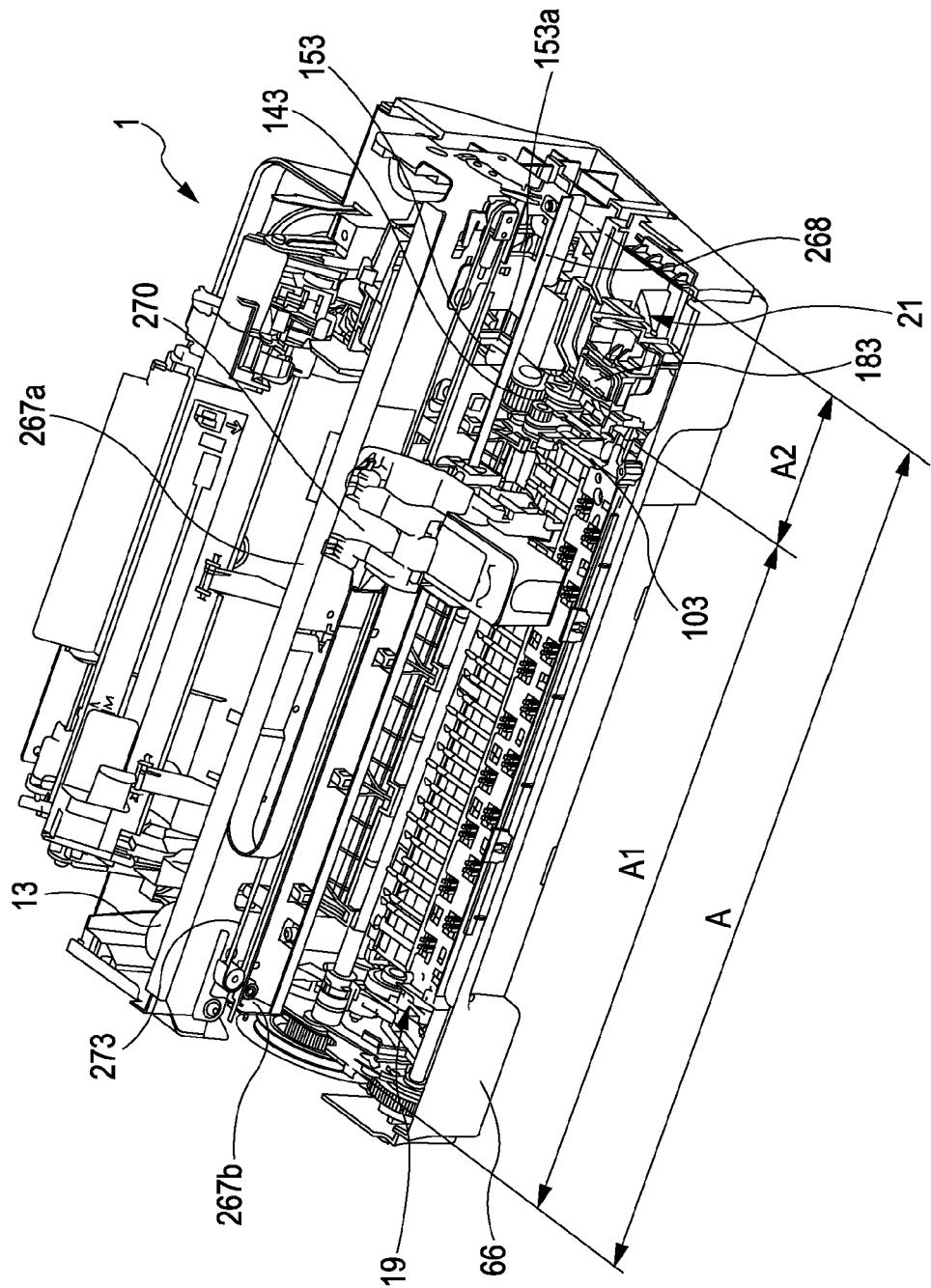
FIG. 2 is a perspective view of the image reading and recording apparatus.
Figure 3:
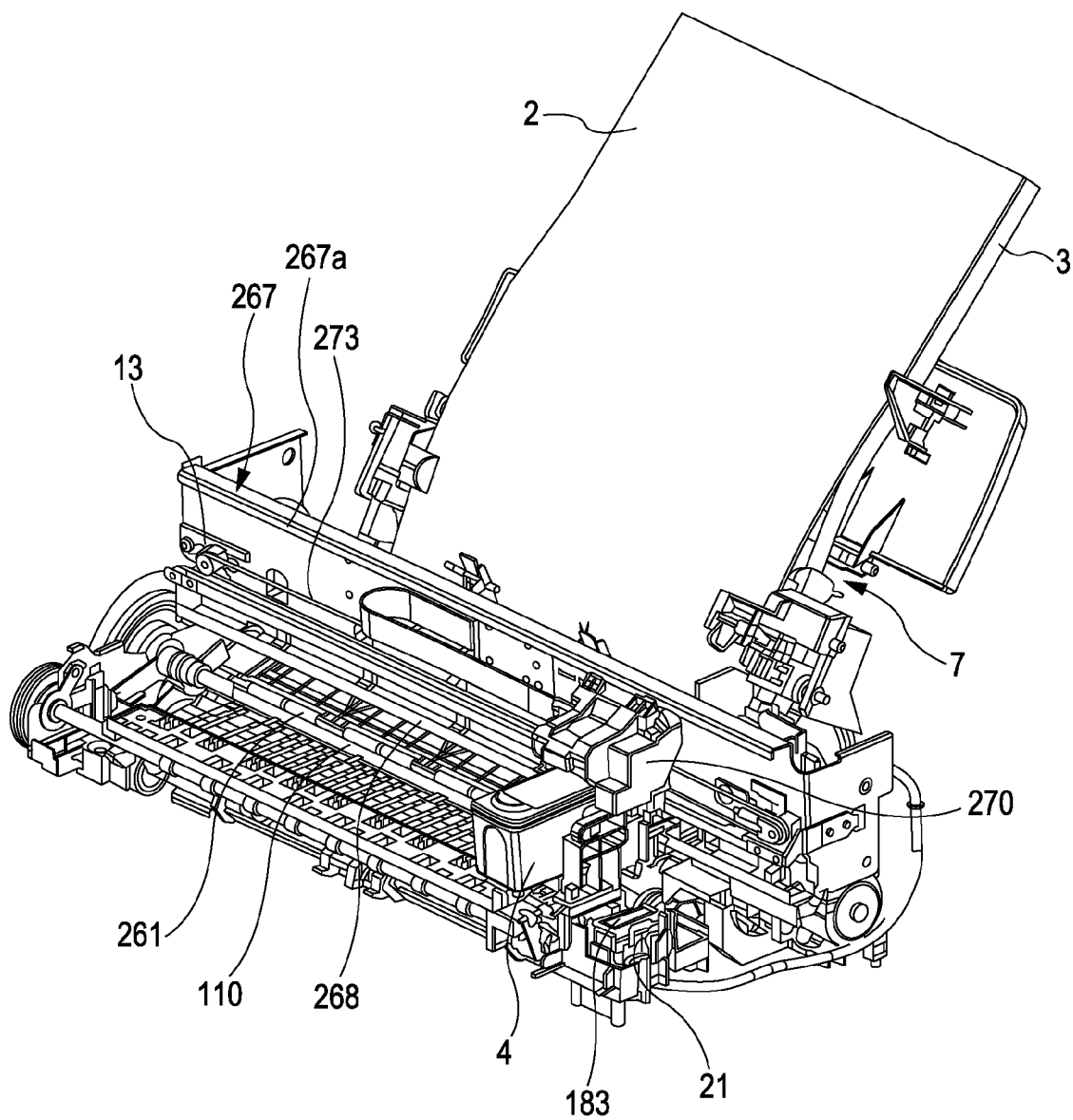
FIG. 3 is a perspective view of the image reading and recording apparatus carrying a document.

Embodiments of the present invention are specifically described with reference to the accompanying drawings, in which like reference characters designate the same or corresponding parts throughout the figures thereof. FIG. 1 is a vertical section that illustrates a general structure of an image reading and recording apparatus according to an embodiment of the present invention. FIG. 2 is a perspective view of the image reading and recording apparatus. FIG. 3 is a perspective view of the image reading and recording apparatus carrying a document. Referring to FIGS. 1 to 3, the image reading and recording apparatus 1 includes a recording head 4 configured to record information on a recording sheet, a reading unit 6 configured to read a document, a paper feed unit 7 configured to supply a sheet of paper, typically, the recording sheet and the document, an ejecting unit 8 configured to eject the recording sheet and the document, and a conveying unit 9 configured to convey the recording sheet and the document. The image reading and recording apparatus 1 is an ink jet recording apparatus that records information by discharging ink onto a recording sheet from the recording head 4 mounted on a reciprocating carriage 270. A discharge recovering portion 21 functions to recover the ability to discharge ink in the recording head 4 and maintain it. An operating panel 26 has a switch operable by a user and an indicator that indicates the operating state of the apparatus.

A recording operation of the image reading and recording apparatus 1 will now be described below. One or more recording sheets 3 placed on a sheet stacking portion 14 in the paper feed unit 7 are transported by a feed roller 155 and a pressure plate 148 pressed into contact with the feed roller 155. The transported sheets 3 are separated one from the other by the feed roller 155 and a separation roller 172. The separated recording sheet 3 is transported to a conveying path 11, which communicates with the conveying unit 9. A conveying roller 110 for conveying a recording sheet and a document is disposed on the conveying path 11, which is shared by recording sheets and documents. The recording sheet 3 is conveyed toward an ejecting roller 112 by the conveying roller 110 and a pinch roller 261 pressed into contact with the conveying roller 110.

The carriage 270 is supported by a chassis rail 268 and a support rail 267a (FIG. 2), which horizontally extend, and can be moved and guided therealong. That is, the carriage 270 is disposed so as to be able to reciprocate in a direction that crosses (typically, substantially orthogonal to) the direction of conveying recording sheets and documents. A platen 231 is disposed at a position that faces the recording head 4. In the present embodiment, as will be described below, the platen 231 is moved to above the conveying path 11 during a reading operation and is moved to a use position as illustrated in FIG. 1 during a recording operation. The recording sheet 3 recorded by discharging of ink from the recording head 4 is ejected from the apparatus main body by the conveying roller 110 and the ejecting roller 112. The ejected recording sheet 3 is placed on a tray or other similar receptacle.

As illustrated in FIG. 2, the discharge recovering portion 21 is disposed within a moving range of the carriage 270 and at the right-hand side in the drawing outside a recording area where recording is performed on a recording sheet. The discharge recovering portion 21 is a device for recovering the ability to record an image (the ability to discharge ink) and maintaining it at a normal state. In FIG. 2, a region A represents a range where the carriage 270 is movable (carriage movable range). A first region A1 represents a range where the carriage 270 is moved in a cap-open state in which a cap 183 is separated from the recording head 4 within the carriage movable range A. A second region A2 represents a range where the carriage 270 is moved in a cap-closed state (capping state) in which the cap 183 is in contact with the recording head 4 within the carriage movable range A.

Figure 4:
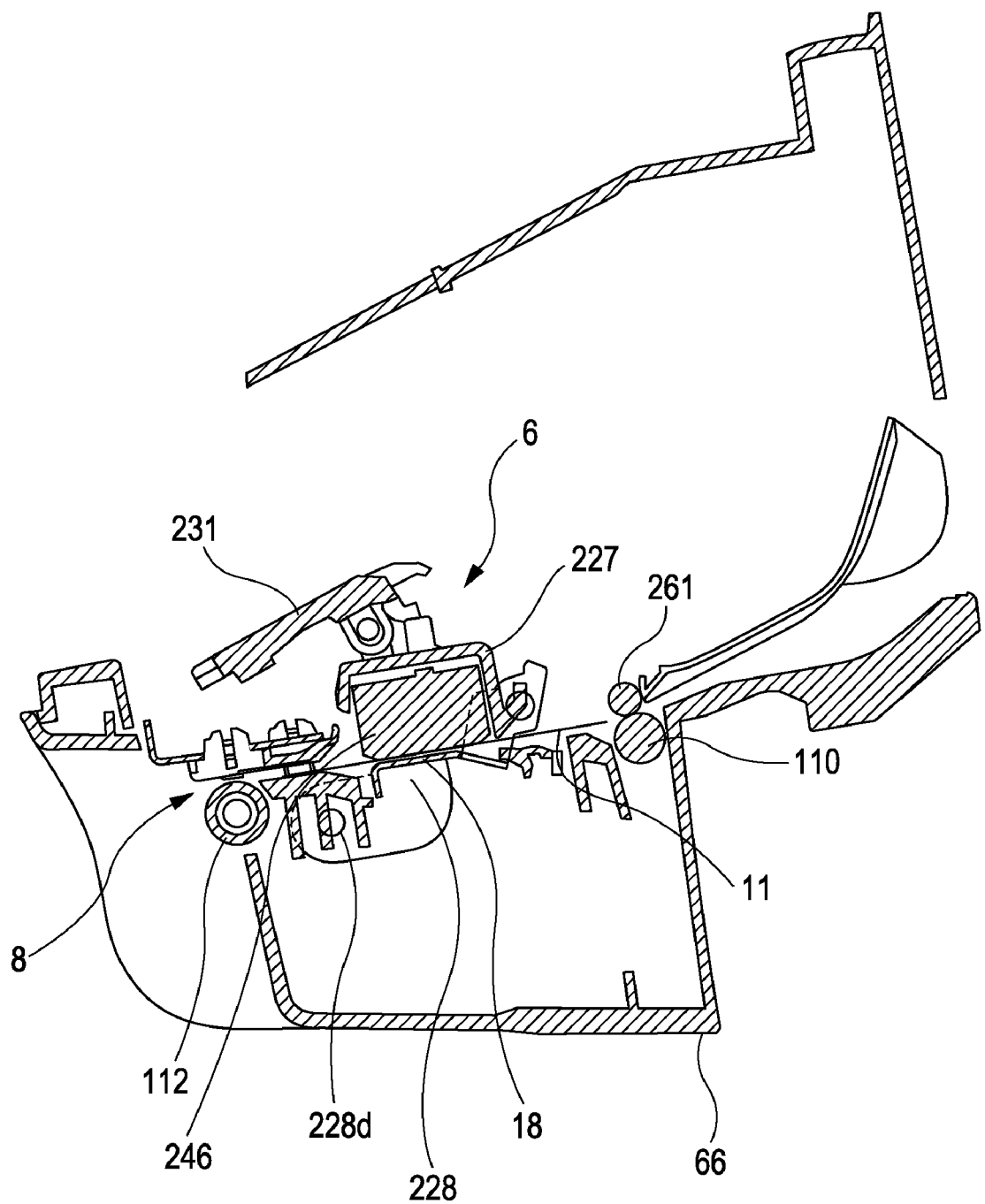
FIG. 4 is a vertical section that illustrates a reading unit and its surroundings during a reading operation.
Figure 5:
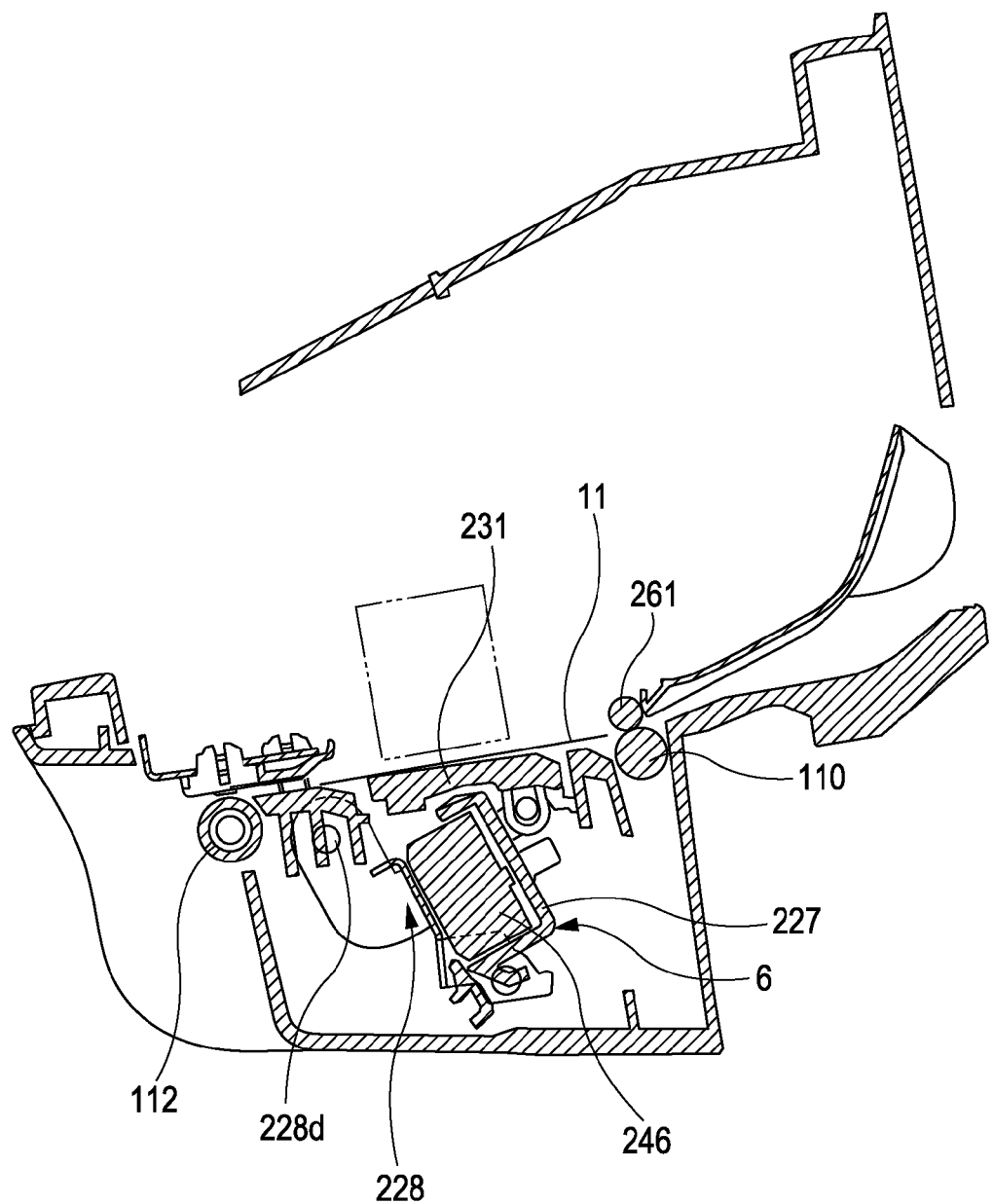
FIG. 5 is a vertical section that illustrates the reading unit and its surroundings during a recording operation.

FIG. 4 is a vertical section that illustrates the reading unit 6 and its surroundings during a reading operation. FIG. 5 is a vertical section that illustrates the reading unit 6 and its surroundings during a recording operation. During a standby state in which a recording operation and a reading operation are not performed, the reading unit 6 for reading a document 2 in the image reading and recording apparatus 1 is maintained at a state illustrated in FIG. 4. When an instruction to start recording is issued in response to an operation of the operating panel 26 in a standby state illustrated in FIG. 4, the reading unit 6 is moved to a withdrawal position below the conveying path 11, and the platen 231 is moved to the use position (FIG. 5) below the conveying path 11.

Thereafter, when the recording operation has been completed, the reading unit 6 is moved from below to above the conveying path 11 and is positioned in a reading state illustrated in FIG. 4 (equal to the standby state). Together with this movement of the reading unit 6, the platen 231 is moved above the conveying path 11. When the reading unit 6 is positioned above the conveying path 11 or is being moved, the carriage 270 is withdrawn to a position outside a sheet conveying region at the right-hand side in the apparatus illustrated in FIG. 2. Thus, the carriage 270 does not interfere with the reading unit 6. During the standby state of the image reading and recording apparatus 1, the carriage 270 is positioned at the discharge recovering portion 21, thus suppressing degradation in the recording ability by causing the cap 183 to be in contact with a discharge surface 4e (FIG. 10) of the recording head 4, as will be described below.

A reading operation of the image reading and recording apparatus 1 will now be described with reference to FIGS. 1 to 4. As illustrated in FIG. 4, during a standby state, the reading unit 6 is positioned above the conveying path 11. When an instruction to read an image is issued in response to an operation of the operating panel 26 from a user or other similar action, one or more documents 2 placed on the sheet stacking portion 14 of the paper feed unit 7 are transported by the feed roller 155 and the pressure plate 148. The transported documents 2 are separated one from the other by the feed roller 155 and the separation roller 172, as in the case of the recording sheets 3. After the document 2 is transported to the conveying roller 110, the document 2 is read by the reading unit 6 while being conveyed along the conveying path 11 by the conveying roller 110 and the ejecting roller 112. After the completion of the reading operation, the document 2 is ejected from the apparatus main body by the conveying roller 110 and the ejecting roller 112. During the reading operation, the recording head 4 is maintained at a capping state in which the cap 183 is in close contact with the recording head 4 at the discharge recovering portion 21.

Figure 6:
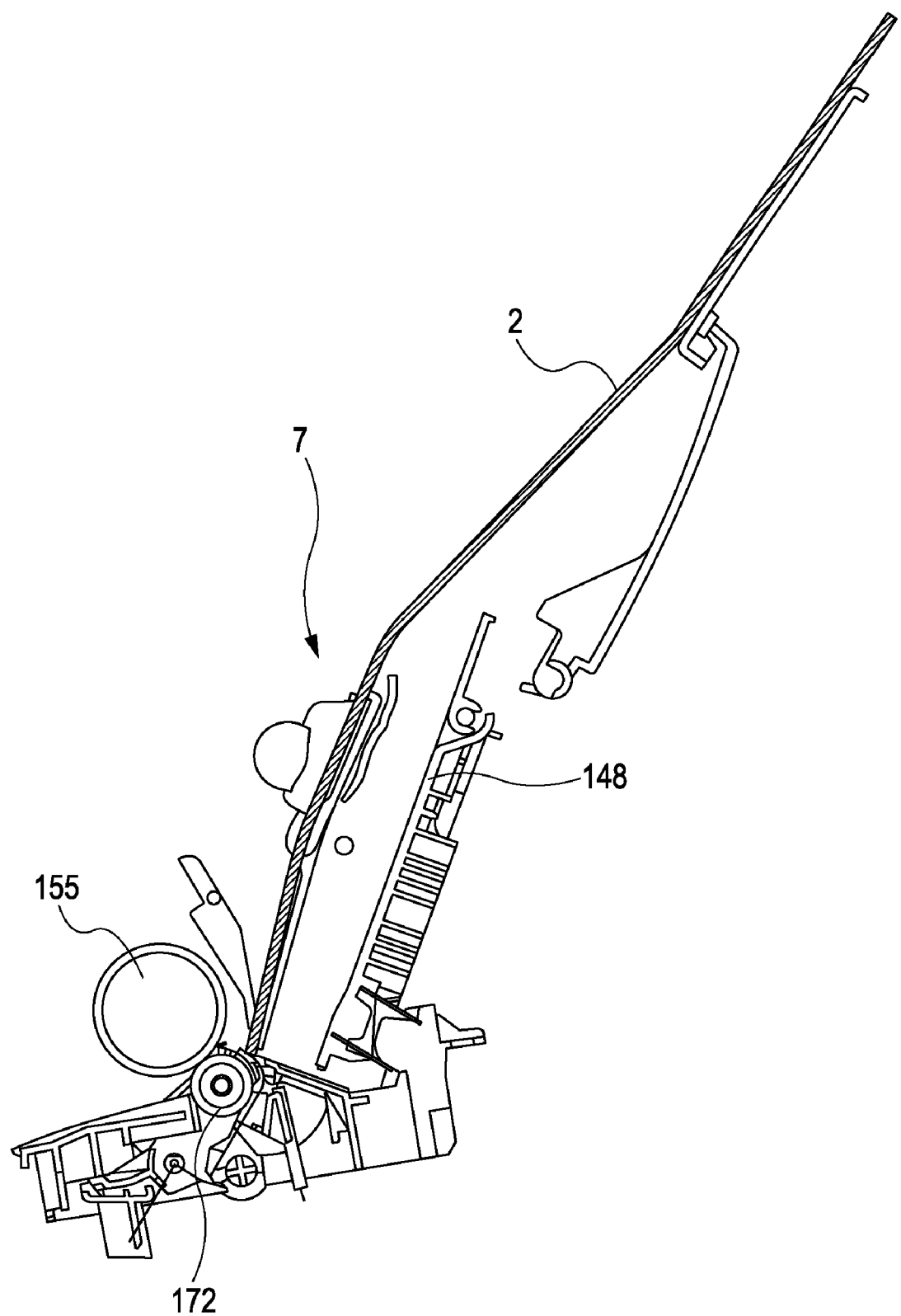
FIG. 6 is a vertical section that illustrates a state in which documents are set.
Figure 7:
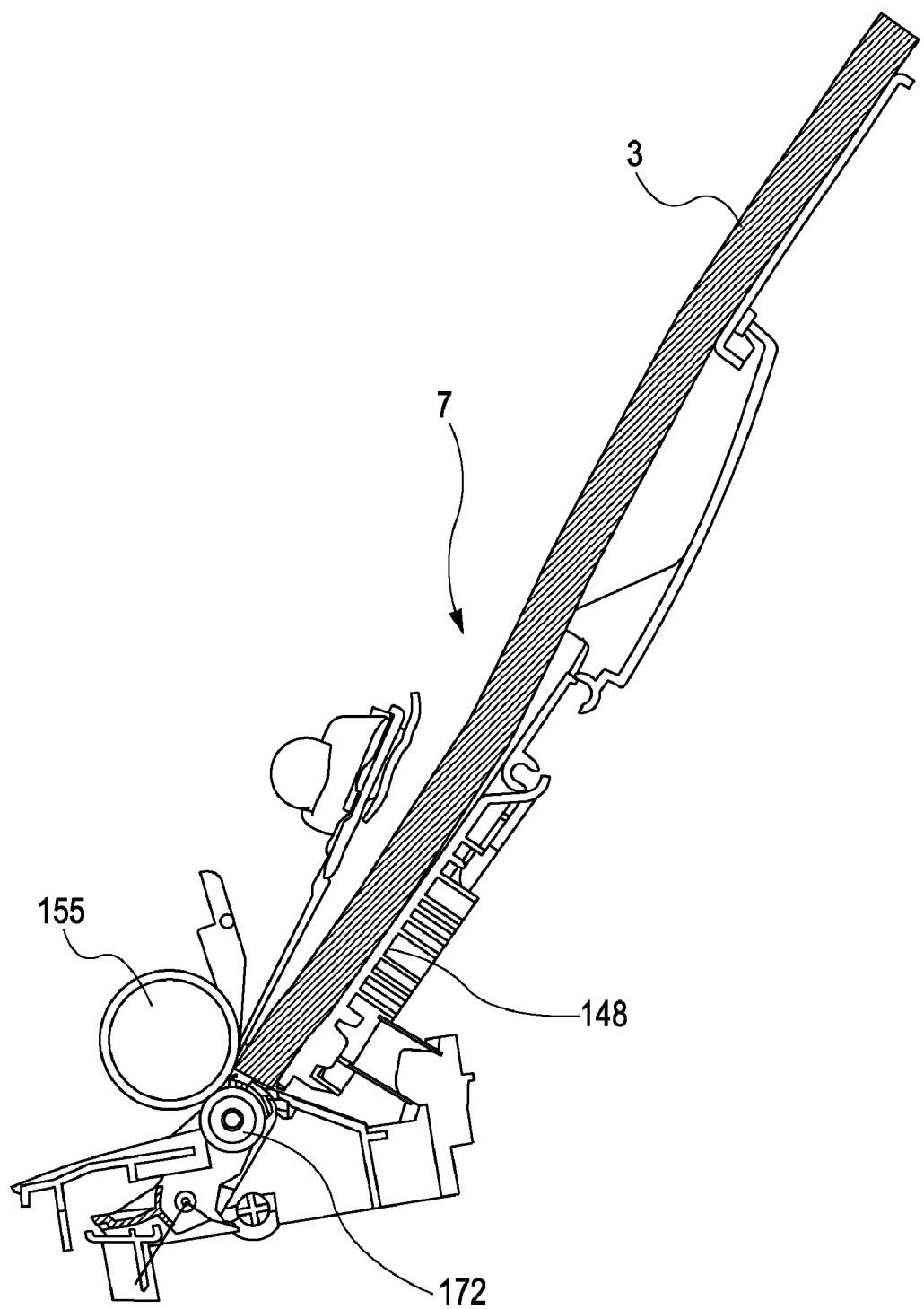
FIG. 7 is a vertical section that illustrates a state in which recording sheets are set.

FIG. 6 is a vertical section that illustrates a state in which documents are set in the image reading and recording apparatus 1. FIG. 7 is a vertical section that illustrates a state in which recording sheets are set in the image reading and recording apparatus 1. The paper feed unit 7 will now be described below. When the recording sheets 3 or the documents 2 (referred to simply as sheets when either one or both of them are indicated) are pressed by the feed roller 155 in response to an operation of the pressure plate 148 at a predetermined timing, the feed roller 155 is driven so as to be rotated. This causes the uppermost sheet in contact with the feed roller 155 to be transported by friction force of the feed roller 155. Examples of the material of the feed roller 155 include a rubber having a high coefficient of friction (e.g., ethylene propylene diene monomer (EPDM)) and a urethane foam to allow a sheet to be transported by friction force.

In most cases, only the uppermost sheet is transported by the rotation of the feed roller 155 because friction force between the feed roller 155 and the sheet is larger than that between the sheets. However, if rough edges are left on the sheets after cutting or the sheets are stuck together by static electricity, or further, if sheets having a significantly high coefficient of friction are used, the rotation of the feed roller 155 may transport a plurality of sheets.

When no sheet is present between the feed roller 155 and the separation roller 172, the separation roller 172 is rotated so as to follow the rotation of the feed roller 155. When a single sheet is inserted between the feed roller 155 and the separation roller 172, because the friction force between the feed roller 155 and the sheet is larger than that between the sheet and the separation roller 172 rotated so as to follow the rotation with a predetermined torque, the sheet is transported while rotating the separation roller 172 so as to follow the sheet. In contrast, when two sheets are inserted between the feed roller 155 and the separation roller 172, because both the friction force between the feed roller 155 and the adjacent sheet and the friction force between the separation roller 172 and the adjacent sheet are larger than that between the sheets, slip occurs between the sheets. As a result, only the sheet adjacent to the feed roller 155 is conveyed.

When three or more sheets are inserted between the feed roller 155 and the separation roller 172, a plurality of sheets may be transported at a time. To avoid this, a return lever 150 (FIG. 8) is provided on a path over which sheets flow (path of sheets) adjacent to the feed roller 155. The return lever 150 is positioned so as to close the path of sheets during a standby state. After a paper feeding operation starts, the return lever 150 is pivoted to the withdrawal position and opens the path of sheets. After the completion of separation of sheets, the return lever 150 is pivoted so as to return the second and subsequent sheets present in a nip between the feed roller 155 and the separation roller 172 to the sheet stacking portion. After the return lever 150 finishes returning the sheets, the return lever 150 is pivoted from the path of sheets to the withdrawal position. When the rear end of the sheet reaches a position downstream from a predetermined point in the conveying direction, the return lever 150 returns to the original standby-state position again.

Figure 8:
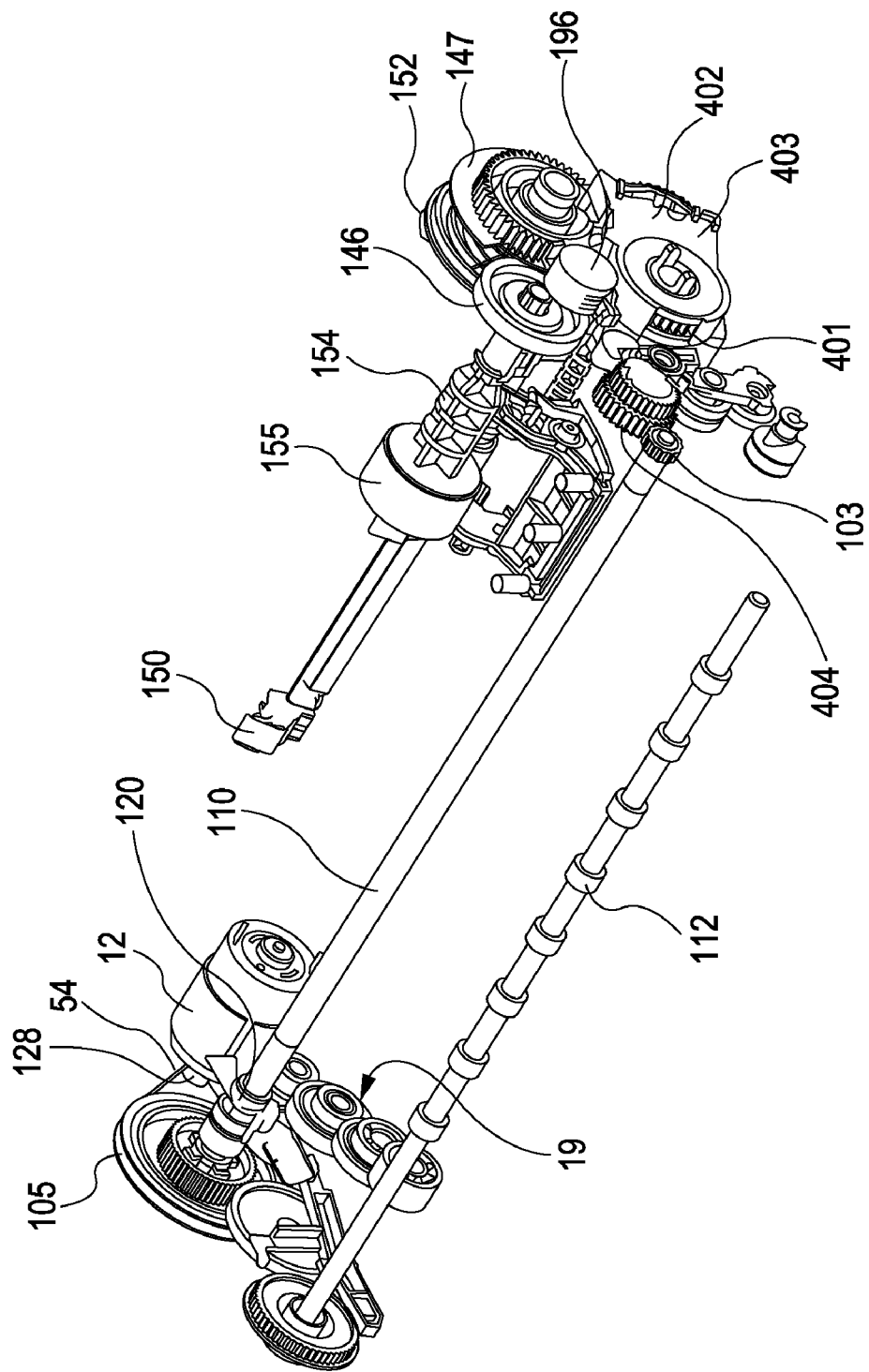
FIG. 8 is a perspective view of a drive transmission mechanism for transmitting a drive of a conveying motor to a conveying roller and a paper feed unit.
Figure 9A:
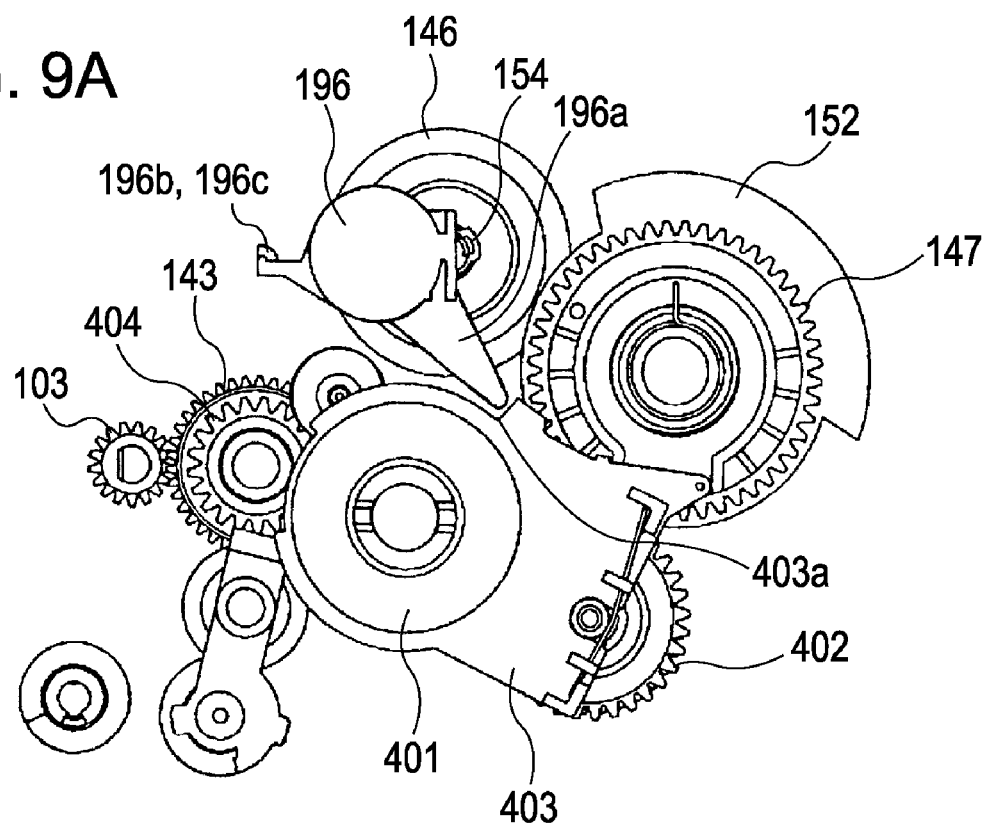
FIGS. 9A and 9B are partial frontal views of a structure of the drive transmission mechanism from the conveying roller to the paper feed unit.
Figure 9B:
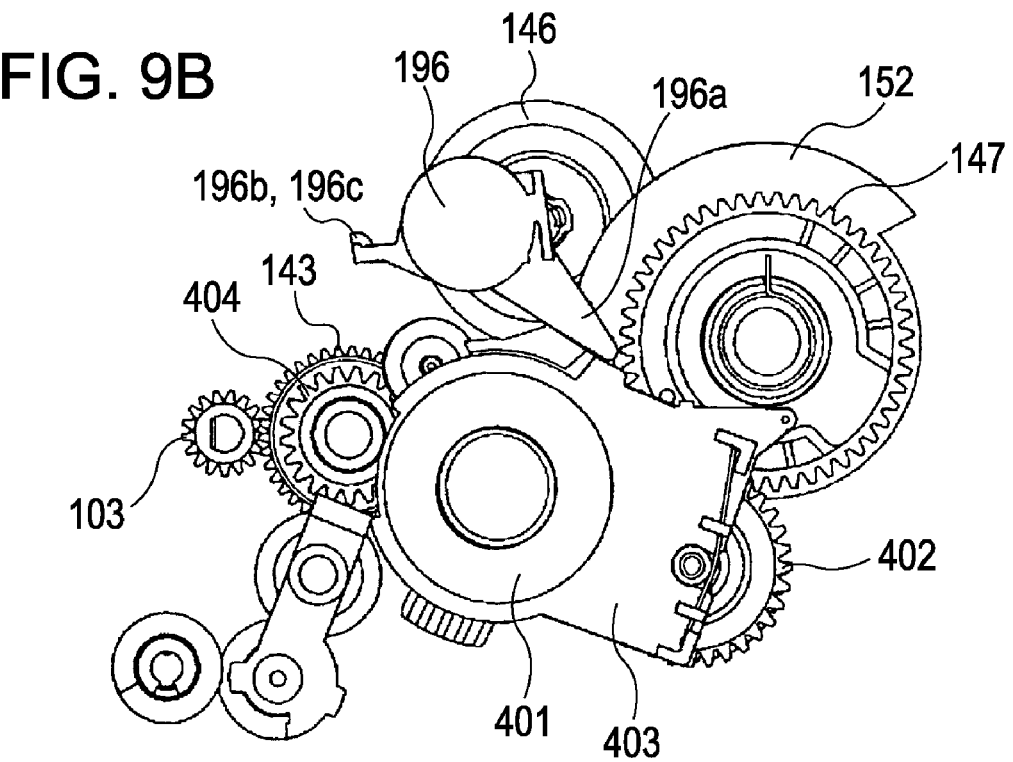

In the image reading and recording apparatus 1, the paper feed unit 7 and the discharge recovering portion 21 are driven by a conveying motor that drives the conveying roller 110. FIG. 8 is a perspective view of a drive transmission mechanism for transmitting a drive of a conveying motor 12 to the conveying roller 110 and the paper feed unit 7. FIGS. 9A and 9B are partial frontal views of a structure of the drive transmission mechanism from the conveying roller 110 to the paper feed unit 7. FIG. 9A illustrates a state in which the drive to the paper feed unit 7 is interrupted. FIG. 9B illustrates a state in which the drive is transmittable to the paper feed unit. FIGS. 8 and 9 illustrate the conveying motor 12, the conveying roller 110, a driving pulley 128, a conveying-roller pulley 105, a conveyance output gear 103, an idler gear 404, a sun gear 401, a planetary gear 402, a planetary arm 403, a feed shaft gear 146, a feed shaft 154, and the feed roller 155. The drive force output from the driving pulley 128 of the conveying motor 12 is transmitted to the conveying roller 110 via a belt 54 and the conveying-roller pulley 105. The drive force of the conveying roller 110 is transmitted to the planetary gear 402 via the conveyance output gear 103, the idler gear 404, and the sun gear 401.

Referring to FIGS. 8 and 9, a trigger arm 196 functions to selectively interrupt and continue transmission of the drive to the paper feed unit 7. The trigger arum 196 is pivotally supported and is urged in a clockwise direction in FIGS. 9A and 9B by a spring (not shown). The sun gear 401 and the planetary gear 402 are supported on the planetary arm 403 and mesh with each other. Friction is applied to rotation of the planetary gear 402. In response to rotation of the sun gear 401, the planetary arm 403 is pivoted (swung) about the sun gear 401. By use of this swinging movement, the transmission of the drive from the planetary gear 402 to the feed shaft gear 146 can be interrupted and continued. In the present embodiment, the transmission of the drive is selectively interrupted and continued by restriction of the swinging movement of the planetary arm 403 using the trigger arm 196.

In a state in which the drive is not transmitted to the paper feed unit 7 (standby state) illustrated in FIG. 9A, an arm portion 196a of the trigger arm 196 pivoted clockwise by the urging force of the spring is engaged with a depression 403a of the planetary arm 403. When the conveying roller 110 (conveyance output gear 103) is rotated in a forward direction (counterclockwise in the drawing), the sun gear 401 is then rotated counterclockwise. In response to this, the planetary arm 403 and the planetary gear 402 initially attempt to be rotated counterclockwise, but the rotation is blocked by the arm portion 196a of the trigger arm 196. As a result, the drive is not transmitted to a control gear 147. Similarly, when the conveying roller 110 (conveyance output gear 103) is rotated in a reverse direction (clockwise), the arm portion 196a of the trigger arm 196 blocks the movement of the planetary arm 403. That is, in the standby state illustrated in FIG. 9A, the planetary arm 403 is not moved counterclockwise, and, when the conveying roller 110 is rotated in both forward and reverse directions, the drive is not transmitted to the paper feed unit 7.

In a state illustrated in FIG. 9B, the trigger arm 196 has been pivoted in a counterclockwise direction in the drawing against the urging force of the spring by a first lever portion 196b or a second lever portion 196c pressed downward. Thus, the arm portion 196a of the trigger arm 196 is separated from the depression 403a of the planetary arm 403, and the trigger arm 196 is in a disengaged state. When the conveying roller 110 in a state illustrated in FIG. 9B is rotated in the forward direction, the sun gear 401 is then rotated counterclockwise, and the planetary arm 403 is also pivoted counterclockwise. This causes the planetary gear 402 to mesh with the control gear 147. Because the control gear 147 meshes with the feed shaft 154, the forward drive of the conveying roller 110 is transmitted to the feed roller 155 via the feed shaft gear 146 and the feed shaft 154, and the feed roller 155 is rotated in the clockwise direction in the drawing.

A control cam 152 incorporates a one way clutch for preventing rotation in the clockwise direction in the drawings. This aims to prevent the feed roller 155 from being rotated in the reverse direction when the conveying roller 110 is made to be rotated in the reverse direction during feeding of a sheet (in particular, recording sheet 3) to correct undesired oblique passage thereof. The planetary gear 402 includes two coaxial gear elements, and a clutch mechanism is arranged therebetween. The clutch mechanism functions to allow the transmission of the drive for the forward rotation of the conveying roller 110 and to prohibit the transmission for the reverse rotation of the conveying roller 110. By use of such a fixing mechanism of the planetary arm 403, advantageously, the carriage can be positioned in any location after the trigger arm 196 is set in position, and other operations can be performed during the state.

A read-drive sun gear 120 (see FIG. 8) is disposed on the shaft of the conveying roller 110. The read-drive sun gear 120 functions to transmit the drive to a read switching unit 19 for pivoting the reading unit 6 between a reading position and the withdrawal position. The read-drive sun gear 120 is disposed between the conveying-roller pulley 105 and a sheet conveying area.

Figure 10:
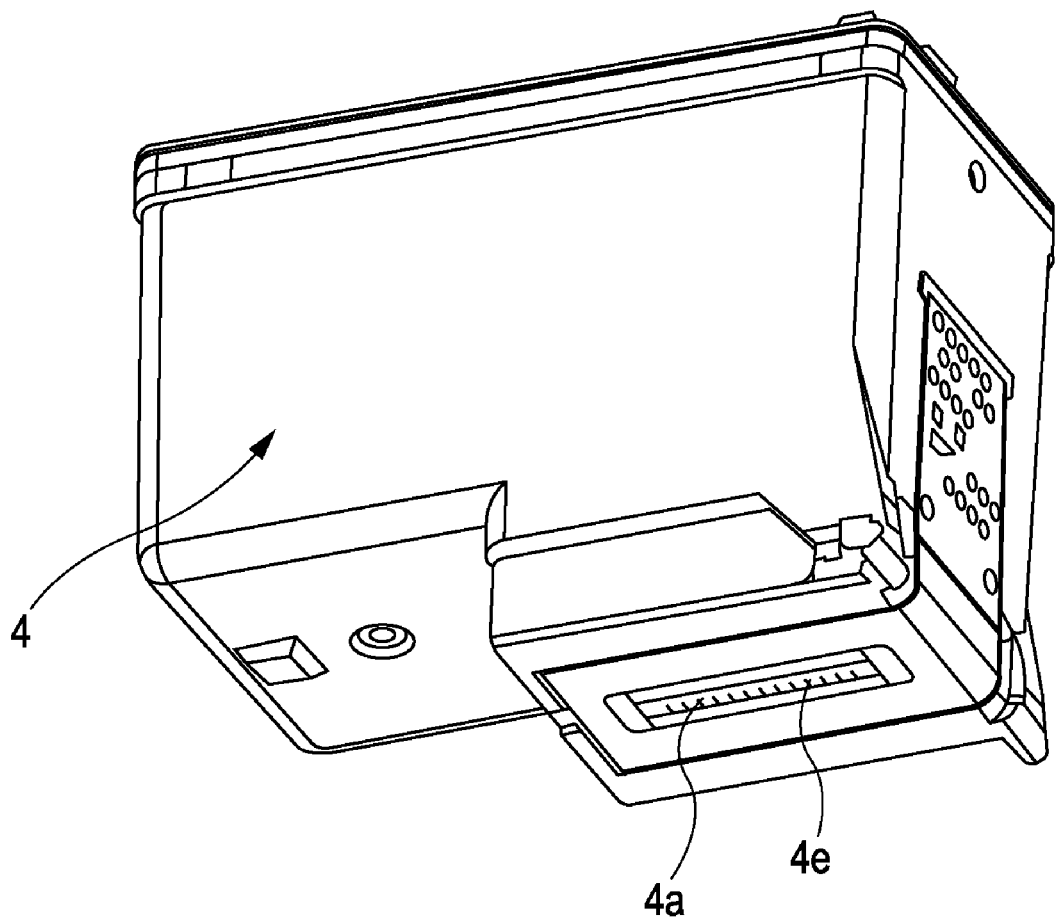
FIG. 10 is a perspective view of a recording head shown in FIG. 1 when viewed from obliquely below.

FIG. 10 is a perspective view of the recording head 4 when viewed from obliquely below. The recording head 4 is of the cartridge type where the recording head is formed integrally with one or more ink tanks. The recording head 4 includes the discharge surface 4e having a plurality of discharge ports 4a formed in a predetermined arrangement at the lower surface.

Figure 11:
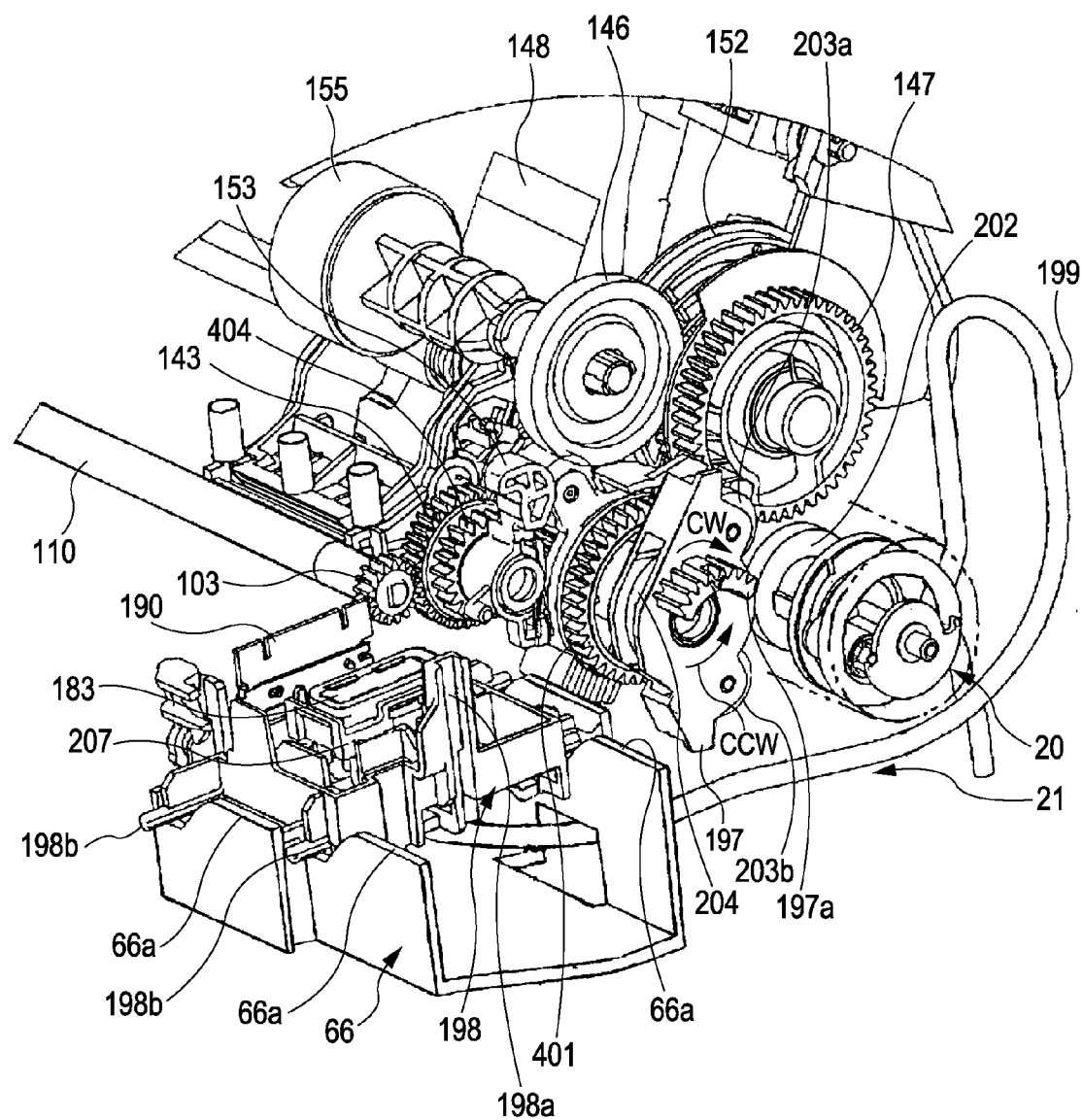
FIG. 11 is a perspective view that illustrates a drive transmission mechanism that transmits a drive to a sucking unit in a discharge recovering portion in the image reading and recording apparatus.

FIG. 11 is a perspective view that illustrates a drive transmission mechanism to the discharge recovering portion 21 in the image reading and recording apparatus. The discharge recovering portion 21 includes the cap 183 capable of contacting with the discharge surface 4e of the recording head 4 and cover the discharge ports 4a and a suction pump (tube pump) 20 connected to the cap 183. Actuating the suction pump 20 while the discharge ports 4a are sealed by the cap 183 can suck and eject ink from the discharge ports 4a, thus restoring ink properties in the discharge ports 4a. The discharge recovering portion 21 also includes a wiper 190 for wiping the discharge surface 4e to remove matter (e.g., ink) attached thereon.

The cap 183 is supported on a cap holder 207. The cap holder 207 is supported on a cap slider 198 so as to be able to be vertically moved and guided. A cap spring for causing the cap 183 to come into contact with the recording head 4 with a predetermined pressing force is disposed between the cap holder 207 and the cap slider 198. The cap slider 198 includes a contact portion 198b slidable along a cam surface 66a formed as a rib of a base 66. The cap slider 198 is spring-urged by a cap-slider spring extending to a part of the base 66 such that the contact portion 198b slides on the cam surface 66a.

The cap slider 198 also includes an abutment portion 198a capable of contacting with the carriage 270. When the carriage 270 is moved from the left-hand side in the drawing to a region of the discharge recovering portion 21, the carriage 270 comes into contact with the abutment portion 198a, thereby causing the cap slider 198 to be moved so as to follow the carriage 270. At this time, together with the movement of the carriage 270 to the right-hand side in the drawing, the cap slider 198 is moved vertically (upward) along the cam surface 66a toward the recording head 4. This ascent of the cap slider 198 causes the cap 183 to come into contact with the discharge surface 4e of the recording head 4 via the cap spring, and the discharge surface 4e is capped (the cap 183 is in a capping state). The position of the carriage 270 in this capping state is referred to as the capping position.

When the carriage 270 is moved from the capping position in a reverse direction (a direction to return to the recording area), the cap slider 198 is moved in a direction to return to the original position (standby position) by the urging force of the cap-slider spring and is moved downward. This descent of the cap slider 198 causes the cap 183 to separate from the discharge surface 4e, and the discharge ports 4a are opened (cap-open state). The cap 183 can seal and open the discharge ports 4a by contacting with the discharge surface 4e of the recording head 4 and separate therefrom by the movement of the carriage 270.

As illustrated in FIG. 11, the drive from the conveying motor 12 is transmitted to the tube pump 20 via the conveying roller 110, the conveyance output gear 103, an idler gear 143, and the sun gear 401. A pump sun gear 204 is rotated integrally with the sun gear 401 in engagement therewith. The drive is transmitted to the tube pump 20 via a drive system in which the pump sun gear 204, a first pump pendulum gear 203a, and a second pump pendulum gear 203b are rotatably supported in a pump pendulum arm 197 so as to be able to swing and rotate about the pump sun gear 204 integrally with each other.

That is, the sun gear 401 is rotated in a direction indicated by "ccw" in the drawing (the direction in which the conveying roller 110 conveys a sheet, i.e., forward direction), the pump sun gear 204 is also rotated counterclockwise in the drawing, and the pump pendulum arm 197 is swung counterclockwise in the drawing. Thus, the second pump pendulum gear 203b meshes with a pump drive gear 202, and this drives the tube pump 20 in a direction that communicates with the air. In contrast, when the sun gear 401 is rotated in a direction indicated by "cw" in the drawing (a direction opposite the direction in which the conveying roller 110 conveys a sheet, i.e., reverse direction), the pump sun gear 204 is also rotated clockwise in the drawing, and the pump pendulum arm 197 is swung clockwise in the drawing. Thus, the first pump pendulum gear 203a meshes with the pump drive gear 202, and this drives the tube pump 20 in a direction that produces a negative pressure. That is, the suction pump 20 is driven in a suction direction in which a tube 199 is squeezed while being pressed in close contact therewith to produce a negative pressure.

Figure 12:
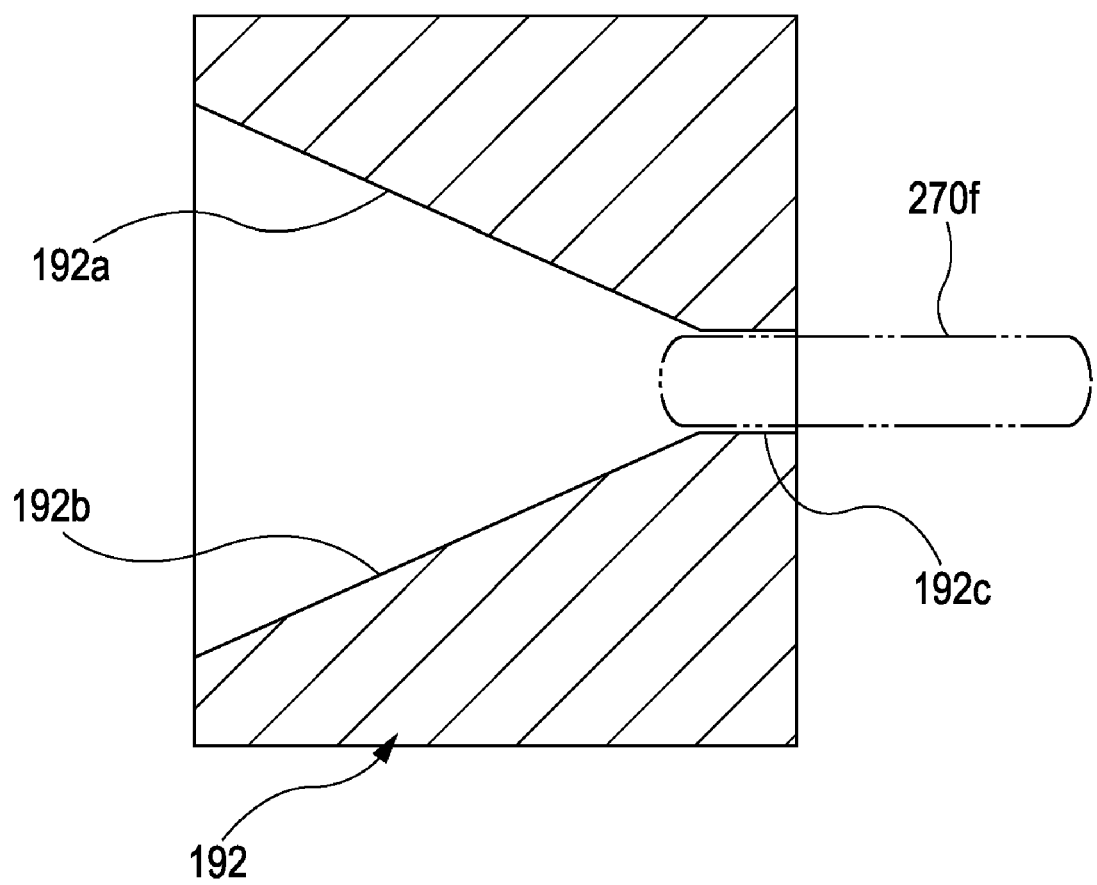
FIG. 12 is a frontal view of a pump drive transmission cam in the image reading and recording apparatus.
Figure 13A:
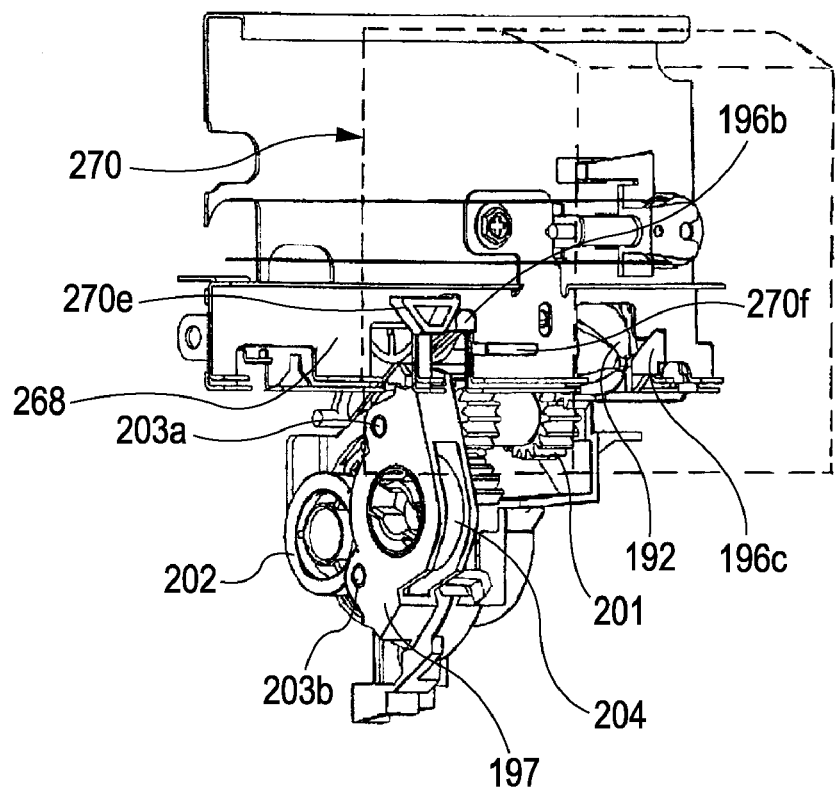
FIGS. 13A and 13B illustrate a state in which a carriage is in a recording standby position.
Figure 13B:
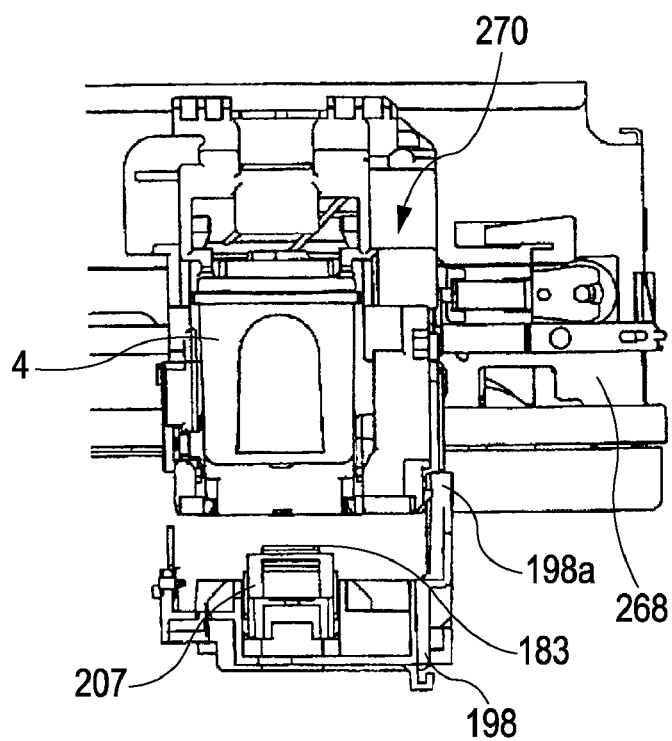
Figure 18:
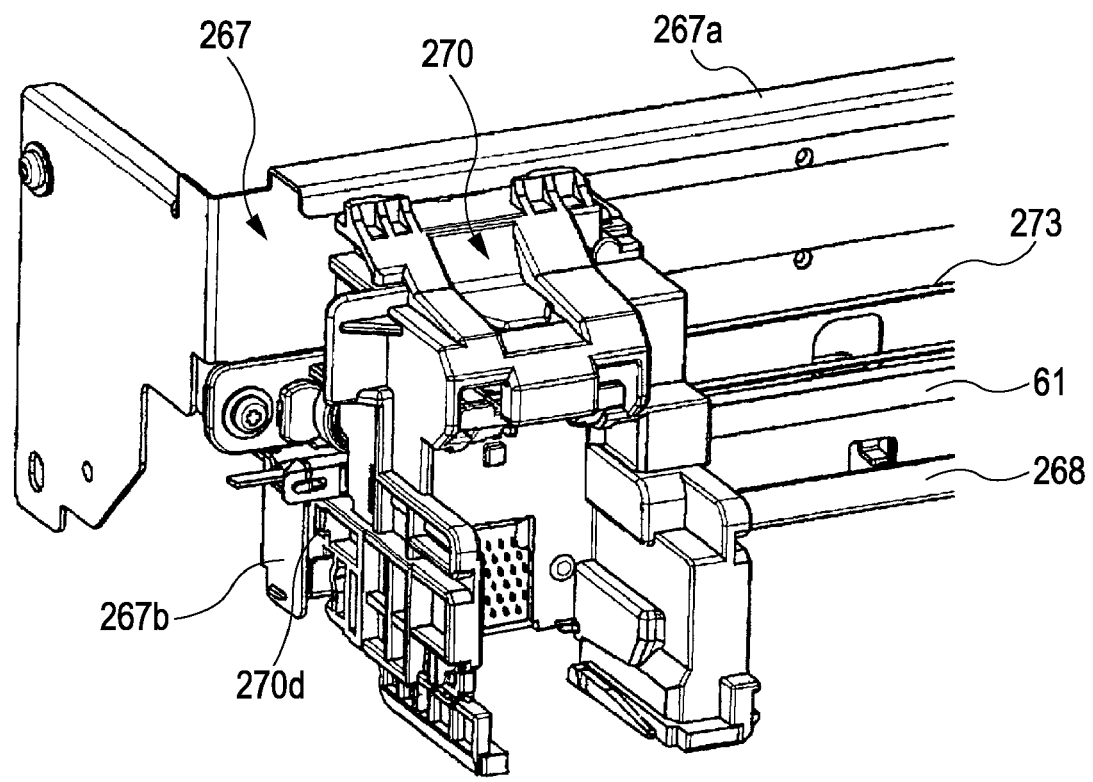
FIG. 18 is a perspective view that illustrates a state in which the carriage is in a basic position in a recording operation at a left end of a main body of the apparatus.

The pump pendulum arm 197 also includes a gear portion 197a coaxial with the pump sun gear 204. The gear portion 197a is gear-coupled to a pump drive transmission cam 192 via a relay gear 201 (FIG. 13A). FIG. 12 is a frontal view of the pump drive transmission cam 192. The pump drive transmission cam 192 includes cam surfaces 192a and 192b and a slot 192c. The pump drive transmission cam 192 is pivotally disposed. The cam surfaces 192a and 192b and the slot 192c are exposed from an opening of the chassis rail 268 (e.g., FIGS. 13A and 13B) of a chassis 267 (FIGS. 1, 3, and 18). The carriage 270 includes a second cam portion 270f (FIGS. 12 and 13A) on the back thereof. When the carriage 270 is moved rightward in the apparatus main body, the second cam portion 270f rotates the pump drive transmission cam 192 while sliding on the cam surface 192a or 192b of the pump drive transmission cam 192, and finally, is fit in the slot 192c.

When the second cam portion 270f of the carriage 270 is fit in the slot 192c, the state is a neutral state in which the first pump pendulum gear 203a and the second pump pendulum gear 203b do not mesh with the pump drive gear 202. When the second cam portion 270f is fit in the slot 192c, the movement of the pump pendulum arm 197 is restricted, and thus, the drive cannot be transmitted to the tube pump 20. When the carriage 270 is moved leftward and the engagement of the second cam portion 270f with the slot 192c is released, the pump pendulum arm 197 can be freely swung. Thus, the drive is transmittable to the tube pump 20.

A control of the operation of the discharge recovering portion 21 and the operation of the paper feed unit 7 utilizing the position of the carriage 270 and the rotary driving of the conveying motor 12 in combination will now be described below. In the trigger arm 196, the arm portion 196a, the first lever portion 196b, and the second lever portion 196c are pivotable integrally with each other. The arm portion 196a can be engaged with the depression 403a of the planetary arm 403. The first lever portion 196b and the second lever portion 196c protrude above the chassis rail 268, which is the path of movement of the carriage 270, and are arranged so as to be pivotable by contacting with the carriage 270.

The first lever portion 196b, the second lever portion 196c, and the pump drive transmission cam 192 are arranged in the right-hand side to the recording area in the apparatus main body. The first lever portion 196b, the pump drive transmission cam 192, and the second lever portion 196c are arranged in this order from the recording area. The trigger arm 196, which is a paper-feed starting member, functions as a trigger that starts transmission of the drive to the paper feed unit 7 in accordance with the position of the carriage 270. The first lever portion 196b is a member for feeding a recording sheet in a state in which the cap 183 is separated from the recording head 4. The second lever portion 196c is a member for feeding a document in a state in which the cap 183 is in contact with the recording head 4 (capping state).

FIGS. 13 to 17 illustrate the relationship among the movement of the carriage 270, the trigger arm 196, and the pump drive transmission cam 192 for transmitting the drive to the suction pump 20. FIGS. 13A, 14A, 15A, 16A, and 17A are perspective views of a drive transmission mechanism with the carriage 270 indicated with dashed lines. FIGS. 13B, 14B, 15B, 16B, and 17B are frontal views illustrating the carriage 270 and its surroundings. FIGS. 13A and 13B illustrate a state in which the carriage 270 is in a recording standby position. FIGS. 14A and 14B illustrate a state in which the carriage 270 is in a recording-sheet feed position. FIGS. 15A and 15B illustrate a state in which the carriage 270 is in a capping position. FIGS. 16A and 16B illustrate a state in which the carriage 270 is in a recovery-drive non-transmission position. FIGS. 17A and 17B illustrate a state in which the carriage 270 is in a document feed position.

FIGS. 13 and 14 illustrate the cap-open state, in which the cap 183 is separated from the recording head 4. FIGS. 15 to 17 illustrate the cap-closed state (capping state), in which the cap 183 is in contact with the recording head 4.

A state in which the carriage 270 is sequentially moved from the recording standby position to each position in a rightward direction in a right-hand region outside the recording area will now be described below. At the recording standby position illustrated in FIGS. 13A and 13B, the cap 183 faces the discharge surface 4e of the recording head 4 and is separated therefrom. At this position, a first cam portion 270e and the second cam portion 270f on the back of the carriage 270 are not engaged with the first lever portion 196b and the second lever portion 196c of the trigger arm 196. That is, the trigger arm 196 is in a first state in which the first lever portion 196b and the second lever portion 196c are pressed upward by the urging force of the spring.

In this first state, the engagement of the trigger arm 196 with the first cam portion 270e and the second cam portion 270f of the carriage 270 is released. Neither the first cam portion 270e nor the second cam portion 270f is engaged with the pump drive transmission cam 192. In this state, the transmission of the drive from the conveying motor 12 to the paper feed unit 7 is interrupted, whereas the drive of the conveying motor 12 is transmittable to the tube pump 20. At this time, when the conveying roller 110 is rotated in the direction of conveying sheets, the tube pump 20 is driven in the direction that communicates with the air. In contrast, when the conveying roller 110 is rotated in the reverse direction, the tube pump 20 is driven in the direction that produces a negative pressure. As a result, the paper feed unit 7 is not driven. Because the cap 183 is separated from the recording head 4, ink is not sucked from the discharge ports 4a even when a negative pressure is produced by the tube pump 20.

Figure 14A:
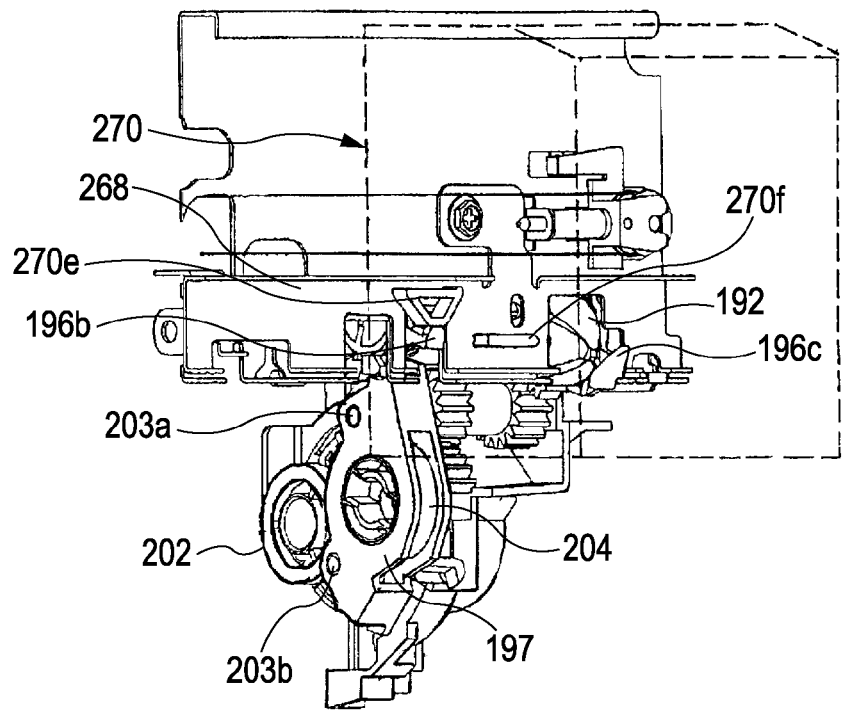
FIGS. 14A and 14B illustrate a state in which the carriage is in a recording-sheet feed position.
Figure 14B:
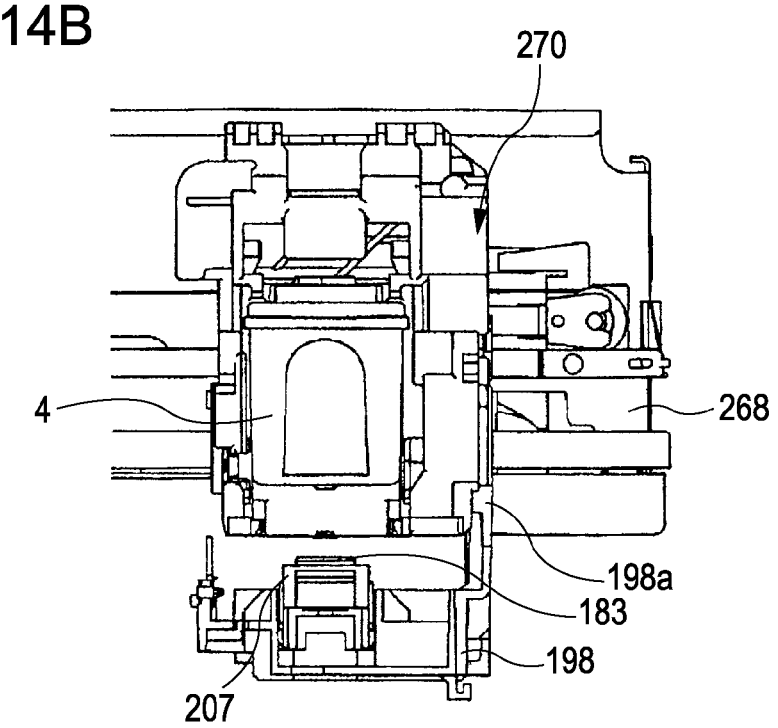

At the recording-sheet feed position illustrated in FIGS. 14A and 14B, the cap 183 faces the discharge surface 4e of the recording head 4 and is separated therefrom. With movement of the carriage 270 from the recording standby position in the rightward direction, the first lever portion 196b is pressed downward along the cam surface of the first cam portion 270e against the urging force of the spring. At this position, the first cam portion 270e of the carriage 270 is engaged with the first lever portion 196b of the trigger arm 196. The trigger arm 196 is in a second state in which the first lever portion 196b is pressed downward against the urging force of the spring by being engaged with the first cam portion 270e. That is, the trigger arm 196 is in the second state in which the trigger arm 196 is engaged with the first cam portion 270e of the carriage 270. In this state, the drive is transmittable from the conveying motor 12 to the paper feed unit 7. With rotation of the conveying roller 110 in the forward direction, feeding a sheet (recording sheet) starts. The drive can also be transmitted to the tube pump 20. The operation of the tube pump 20 is the same as that occurring in the recording standby position described above.

Figure 15A:
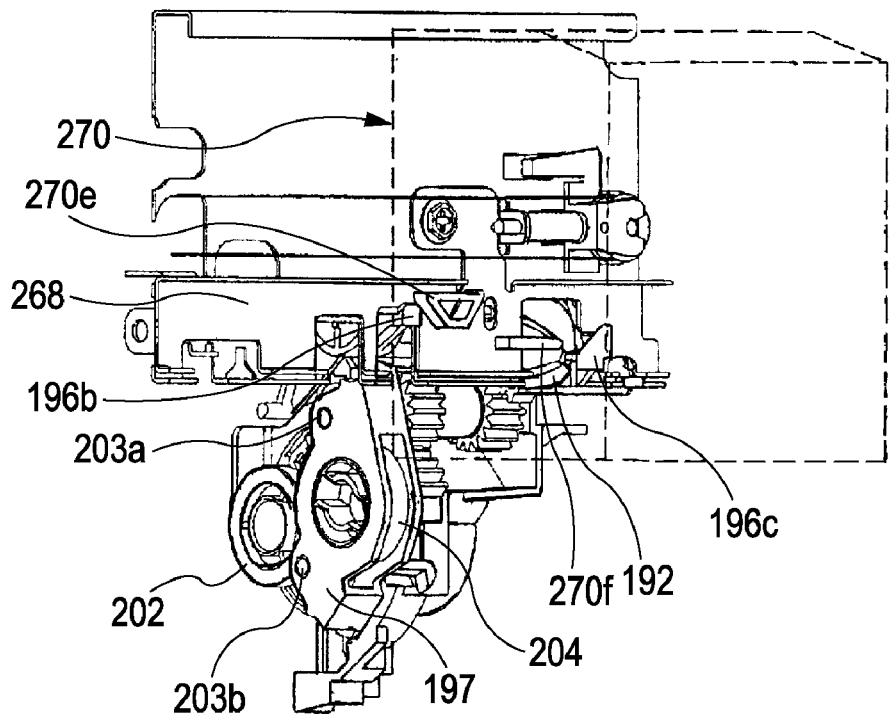
FIGS. 15A and 15B illustrate a state in which the carriage is in a capping position.
Figure 15B:
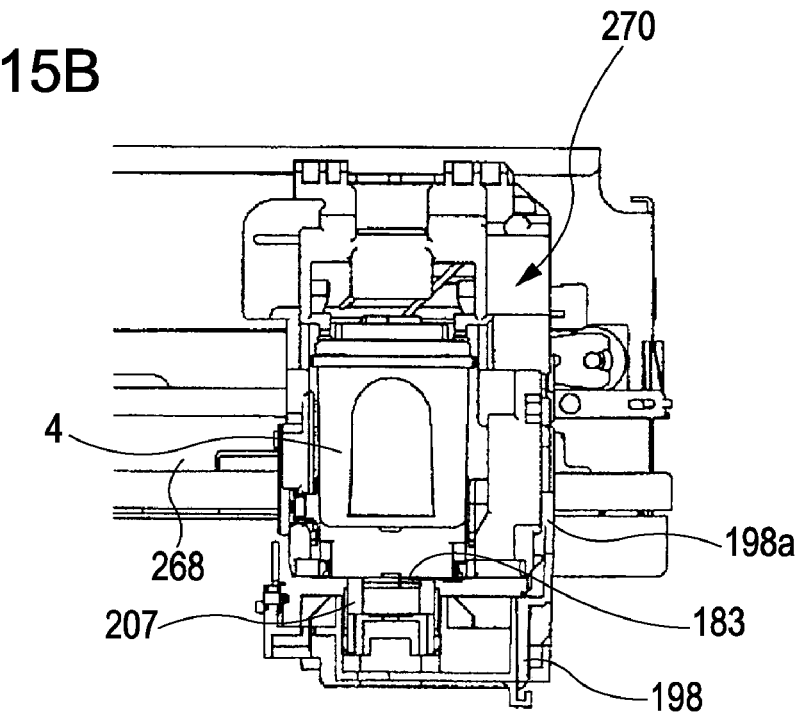

At the capping position illustrated in FIGS. 15A and 15B, the cap 183 faces the discharge surface 4e of the recording head 4 and is in contact therewith. With movement of the carriage 270 from the recording-sheet feed position in the rightward direction, the engagement of the first lever portion 196b with the first cam portion 270e is released, and the first lever portion 196b returns to an upward pressed state by the urging force of the spring again. At this position, the transmission of the drive from the conveying motor 12 to the paper feed unit 7 is interrupted, whereas the drive is transmittable to the tube pump 20. In this case, the operation of the tube pump 20 itself is the same as that occurring in the recording standby position. At this position, because the cap 183 is in contact with the discharge surface 4e, ink can be sucked from the discharge ports 4a by rotation of the conveying roller 110 in the reverse direction. The trigger arm 196 is in the first state, in which the engagement of the trigger arm 196 with the first cam portion 270e and the second cam portion 270f of the carriage 270 is released.

Figure 16A:
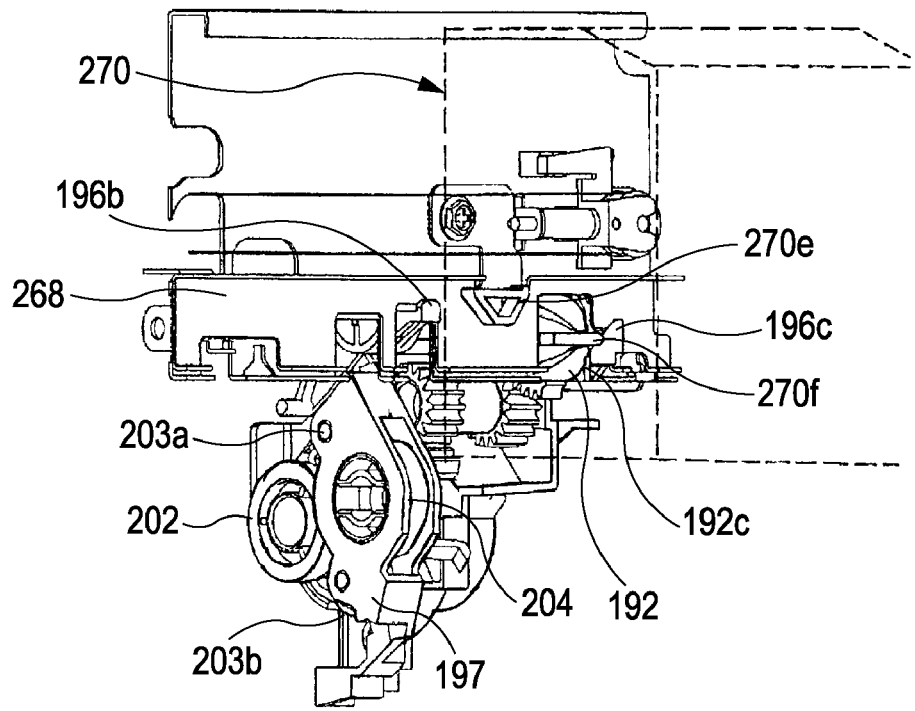
FIGS. 16A and 16B illustrate a state in which the carriage is in a recovery-drive non-transmission position.
Figure 16B:
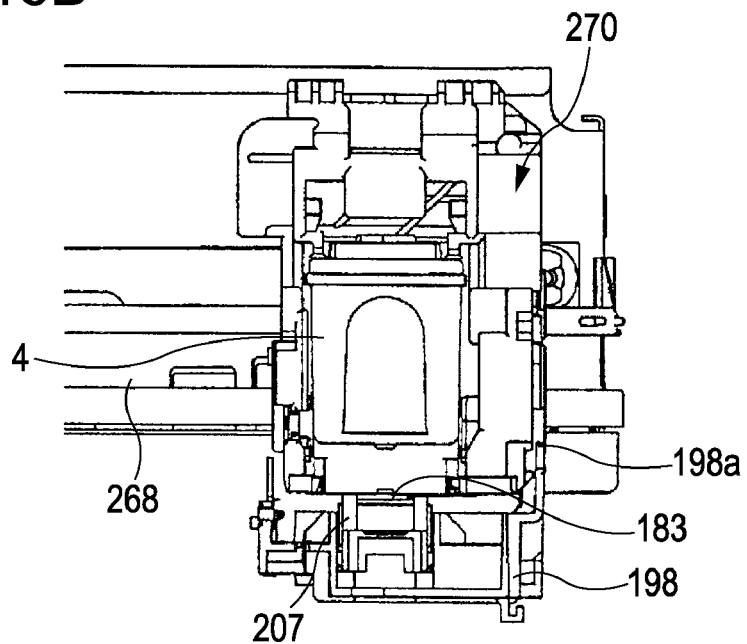

At the recovery-drive non-transmission position illustrated in FIGS. 16A and 16B, the cap 183 faces the discharge surface 4e and is in contact therewith. At this position, the cap 183 is in the capping state, but the discharge recovering portion 21 is not driven. With movement of the carriage 270 from the capping position illustrated in FIGS. 15A and 15B in the rightward direction, the pump drive transmission cam 192 is rotated while the second cam portion 270f slides on the cam surface 192a or 192b. The rotation is finally stopped when the second cam portion 270f is fitted in the slot 192c. In this way, the carriage 270 is in the recovery-drive non-transmission state illustrated in FIGS. 16A and 16B. Also, at this position, the first lever portion 196b and the second lever portion 196c of the trigger arm 196 are not engaged with the first cam portion 270e and the second cam portion 270f of the carriage 270. As a result, the trigger arm 196 is in the first state, in which the first lever portion 196b and the second lever portion 196c are pressed upward by the urging force of the spring.

At the position illustrated in FIGS. 16A and 16B, the drive from the conveying motor 12 is transmitted to neither the paper feed unit 7 nor the suction pump 20. According to the present embodiment, in the movement of the carriage 270 to the position illustrated in FIGS. 16A and 16B from other positions, the carriage 270 is moved through a neutral state in which the pump pendulum arm 197 meshes with neither the first pump pendulum gear 203a nor the second pump pendulum gear 203b. This aims to reduce a load imposed on a carriage motor 13 (FIGS. 2 and 3).

Figure 17A:
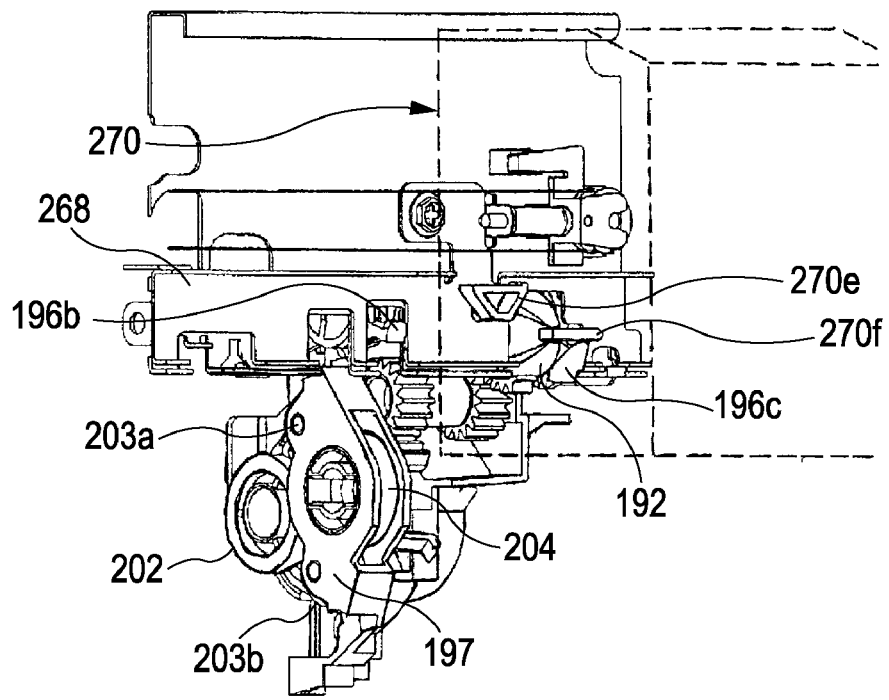
FIGS. 17A and 17B illustrate a state in which the carriage is in a document feed position.
Figure 17B:
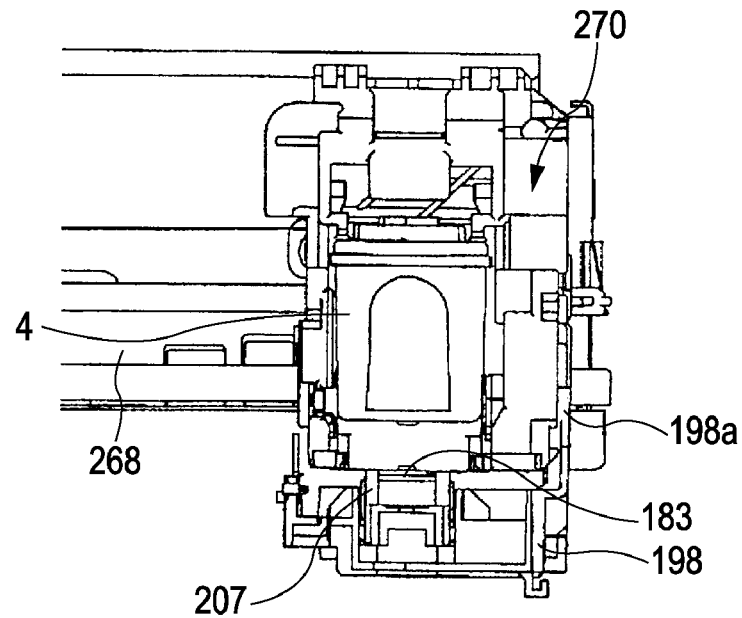

At the document feed position illustrated in FIGS. 17A and 17B, the cap 183 faces the discharge surface 4e and is in contact therewith. At this position, the transmission of the drive to the discharge recovering portion 21 is interrupted. At the document feed position illustrated in FIGS. 17A and 17B, the cap 183 is in the capping state, and the drive cannot be transmitted to the recovery system and is transmittable to the paper feed unit 7. With movement of the carriage 270 from the position illustrated in FIGS. 16A and 16B, at which the cap 183 is in the capping state and the drive cannot be transmitted to the recovery system, in the rightward direction, the second lever portion 196c of the trigger arm 196 is pressed downward along the cam surface of the second cam portion 270f against the urging force of the spring. The carriage 270 is in the second state in which the second cam portion 270f of the carriage 270 is engaged with the second lever portion 196c of the trigger arm 196.

As described above, according to the present embodiment, the feeding operations of recording sheets and documents and the discharge recovery operation for the recording head can be controlled in combination by the movement of the carriage 270.

FIG. 18 is a perspective view that illustrates a state in which the carriage 270 is in a basic position in a recording operation at the left end of the apparatus main body. The carriage 270 is driven by a timing belt 273 driven by the carriage motor (not shown in FIG. 18). The timing belt 273 is looped over a driving pulley and an idler pulley. A code strip 61 for detecting the position of the carriage 270 extends in parallel to the path of movement of the carriage 270. The basic position illustrated in FIG. 18 can also be used as a maintenance position for replacing the recording head 4 with a new one.

Obtaining the basic position of the carriage 270 will now be described below. First, the basic position in a recording operation is obtained by causing an abutment portion 270d provided on the carriage 270 to come into contact with an abutment portion 267b provided on the left end of the chassis 267.

In the present embodiment, the reading unit 6 is positioned above the conveying path 11, which is shared by recording sheets and documents, when reading an image of a document fed from the paper feed unit 7 and conveyed by the conveying roller 110. When the reading unit 6 is in this raised reading position in the capping state illustrated in FIGS. 15A and 15B, the carriage 270 is in the standby state. When an instruction to read a document in this standby state is issued, it is necessary to move the carriage 270 to the document feed position illustrated in FIGS. 17A and 17B. This is because a feeding operation needs to be performed in the capping state and in a state in which the tube pump 20 is not actuated even when the conveying roller 110 is rotated.

To reliably move the carriage 270 to the document feed position, it is necessary to obtain the basic position of the carriage 270. However, because the reading unit 6 lies in the path of movement of the carriage 270, it is impossible to obtain the basic position by moving the carriage 270 to the left end of the apparatus main body, as described above.

Accordingly, in the present embodiment, a second abutment basic position is provided on an end (left end) adjacent to the recording area in an area where the carriage 270 is moved in the capping state. A mechanism for obtaining the second abutment basic position will now be specifically described below. A carriage lock lever 153 (FIGS. 2 and 11) protrudes above the chassis rail 268 guiding the carriage 270. In the capping state, the basic position can be obtained by causing the abutment portion 270d of the carriage 270 to come into contact with a right side surface 153a (FIG. 2) of the carriage lock lever 153.

The carriage lock lever 153 is attached on the shaft of the idler gear 143 under predetermined load from a spring member (not shown). The carriage lock lever 153 is pivotable so as to follow rotation of the idler gear 143. When the conveying roller 110 is rotated in the reverse direction, the carriage lock lever 153 follows the rotation of the idler gear 143 and is pivoted in a direction that protrudes above the chassis rail 268. The carriage lock lever 153 comes into contact with an adjacent part of the chassis rail 268 when entering the path of movement of the carriage 270. While sliding on the idler gear 143 against load imposed at this time, the carriage lock lever 153 is maintained at a protruding state.

When the conveying roller 110 is rotated in the forward direction, the carriage lock lever 153 follows the rotation of the idler gear 143 and is pivoted in a direction that withdraws from the chassis rail 268, opposite the direction described above. The pivoting of the carriage lock lever 153 is blocked by a stopper (not shown) when the carriage lock lever 153 is fully withdrawn from the path of movement of the carriage 270. While sliding on the idler gear 143 again, the carriage lock lever 153 is maintained at a withdrawal state. When the carriage 270 is moved to a region of the capping state, the conveying roller 110 is rotated in the reverse direction and the carriage lock lever 153 is protruded. The abutment portion 270d of the carriage 270 is made to come into contact with the right side surface 153a of the carriage lock lever 153, thereby obtaining the basic position in the capping state.

As illustrated in FIG. 2, the movable range A of the carriage 270 includes the first region A1 where the carriage 270 is moved in a state in which the cap 183 is separated from the recording head 4 and the second region A2 where the carriage 270 is moved in a state in which the cap 183 is in contact with the recording head 4. Each of an end of the first region A1 and an end of the second region A2 has the basic position for movement for the carriage 270. To feed a recording sheet when the cap 183 is separated from the recording head 4, the first lever portion 196b is positioned in the first region A1. To feed a document when the cap 183 is in contact with the recording head 4, the second lever portion 196c is positioned in the second region A2.

To prevent the carriage 270 from moving from the second region A2 to the first region A1, the carriage lock lever 153 is provided so as to be able to protrude into the path of movement of the carriage 270. By use of the side surface of the carriage lock lever 153 protruding into the path of movement of the carriage 270, the basic position of the carriage 270 in the second region A2 is obtained.

The carriage lock lever 153 can be used to avoid disadvantages occurring in a cap-open state caused by a user inadvertently moving the carriage during non-use or shipping. More specifically, the carriage lock lever 153 can be used to avoid disadvantages, such as recording defects resulting from dryness of the discharge surface 4e or damages of the carriage caused by a collision with the reading unit 6, occurring in a cap-open state caused by careless handling. In the present embodiment, the basic position of the carriage in the capping state is obtained by use of the carriage lock lever 153. As a result, the basic position can be obtained, while at the same time parts are effectively used and costs are reduced.

The state of the reading unit 6 during a standby operation and a reading operation is illustrated in FIG. 4. The position of the reading unit 6 during a recording operation is illustrated in FIG. 5. The reading unit 6 includes a white reference member 228, a sensor holder 227, and a read sensor 246. The white reference member 228 is pivotable about a shaft hole 228d supported by the apparatus main body. The sensor holder 227 is attached to the white reference member 228. The read sensor 246 is held by the sensor holder 227. These parts have a geometry that extends in a direction crossing the conveying direction over the length of the width of a document. A reading portion 18 being a path of conveying the document 2 is formed between the read sensor 246 and the white reference member 228. In the present embodiment, the platen 231 forming a part of the conveying path of recording sheets by facing the recording head 4 in a recording operation is pivotally attached to the sensor holder 227.

The reading unit 6 is moved from the withdrawal position in a recording operation illustrated in FIG. 5 to the reading position in a reading operation illustrated in FIG. 4 while being pivoted about the shaft hole 228d of the white reference member 228. The read switching unit 19 for switching and moving the reading unit 6 between the reading position and the withdrawal position is disposed at a position that is in the movable range of the carriage 270 at the left end of the apparatus main body and that is outside the recording area. The read switching unit 19 is also pivoted to the reading position or the withdrawal position by use of forward rotation or reverse rotation of the conveying roller 110. The reading unit 6 that has moved to the reading position is maintained at the reading position by a locking unit (not shown).

According to the embodiment described above, the image reading and recording apparatus that starts a feeding operation of a recording sheet or a document in accordance with the position of the carriage can start the feeding operation both when the cap is in contact with the recording head and when the cap is separated from the recording head. The throughput in a recording operation can be improved by feeding a recording sheet in a state in which the recording head and the cap are separated from each other. Additionally, unnecessary recovery operations for the recording head can be reduced by feeding a document in a state in which the recording head and the cap are in contact with each other. The sheet fed in a state in which the recording head and the cap are in contact with each other is not limited to a document. For example, a sheet for cleaning the conveying path can be fed.

The apparatus that changes the operation state of the recovery unit and the operation of the paper feed unit in accordance with the position of the recording head according to the present embodiment can obtain the basic position of the carriage for operation when the cap is separated from the recording head without changing the separate state and can also obtain the basic position for operation when the cap is in contact with the recording head without changing the contact state. Accordingly, the necessity to shift from the contact state of the cap to the separate state, and vice versa, when information on the basic position of the recording head is obtained can be obviated.

The embodiment described above can provide an image reading and recording apparatus capable of switching a recording operation and a reading operation in a short time without a reduction in throughput and waste of ink caused by a recovery operation for a recording head.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2006-353971 filed Dec. 28, 2006, which is hereby incorporated by reference herein in its entirety.

What is claimed is:

1. An image reading and recording apparatus comprising:
   a carriage configured to move a recording head mounted thereon, the recording head discharging ink onto a recording sheet to record information;
   a reading unit configured to read an image of a document;
   a paper feed unit configured to feed a recording sheet or a document;
   a conveying roller configured to convey a recording sheet or a document;
   a motor configured to drive the conveying roller;
   a cap contacting with or separating from the recording head mounted on the carriage in accordance with movement of the carriage; and
   a paper-feed starting member configured to transmit a drive of the motor to the paper feed unit in accordance with movement of the carriage, the paper-feed starting member including a first lever portion and a second lever portion, the first lever portion triggering feeding a recording sheet when being engaged with the carriage in a state in which the recording head and the cap are separated from each other, the second lever portion triggering feeding a document when being engaged with the carriage in a state in which the recording head and the cap are in contact with each other.

2. The image reading and recording apparatus according to claim 1, wherein the second lever portion is disposed opposite a recording area where recording is performed using the recording head, with the first lever portion arranged therebetween.

3. The image reading and recording apparatus according to claim 2, wherein the carriage includes a first cam portion configured to pivot the paper-feed starting member by being engaged with the first lever portion, and a second cam portion configured to pivot the paper-feed starting member by being engaged with the second lever portion.

4. The image reading and recording apparatus according to claim 3, wherein the carriage is movable to a first position where the first lever portion and the first cam portion are engaged with each other and to a second position where the second lever portion and the second cam portion are engaged with each other.

5. The image reading and recording apparatus according to claim 4, wherein the second position is opposite the recording area, with the first position arranged therebetween.

6. The image reading and recording apparatus according to claim 1, further comprising:
   a planetary gear configured to transmit the drive of the motor to the paper feed unit; and
   a planetary arm configured to rotatably support the planetary gear.

7. The image reading and recording apparatus according to claim 6, wherein the paper-feed starting member includes an arm portion blocking movement of the planetary arm when being engaged with the planetary arm.

8. The image reading and recording apparatus according to claim 7, wherein the paper-feed starting member is pivotable to a first state in which the arm portion is engaged with the planetary arm and to a second state in which the arm portion is separated from the planetary arm.

9. The image reading and recording apparatus according to claim 8, further comprising:
   an urging unit configured to urge the paper-feed starting member to the first state.

10. An image reading and recording apparatus comprising:
    a carriage configured to move a recording head mounted thereon, the recording head discharging ink onto a recording sheet to record information;
    a reading unit configured to read an image of a document;
    a paper feed unit configured to feed a recording sheet or a document;
    a conveying roller configured to convey a recording sheet or a document;
    a motor configured to drive the conveying roller;
    a cap contacting with or separating from the recording head mounted on the carriage in accordance with movement of the carriage;
    a paper-feed starting member configured to transmit a drive of the motor to the paper feed unit in accordance with movement of the carriage;
    a first abutment portion configured to obtain position information of the carriage when being contacted by the carriage in a state in which the recording head and the cap are separated from each other; and
    a second abutment portion configured to obtain position information of the carriage when being contacted by the carriage in a state in which the recording head and the cap are in contact with each other.

11. The image reading and recording apparatus according to claim 10, wherein the first abutment portion is disposed at an end of a first region where the carriage is moved in a state in which the recording head and the cap are separated from each other, and
    wherein the second abutment portion is disposed at an end of a second region where the carriage is moved in a state in which the recording head and the cap are in contact with each other.

12. The image reading and recording apparatus according to claim 11, wherein the first abutment portion is a chassis.

13. The image reading and recording apparatus according to claim 11, wherein the second abutment portion is a lever capable of protruding into a path of movement of the carriage.

14. The image reading and recording apparatus according to claim 13, wherein the lever prevents the carriage from moving from the second region to the first region.

* * * * *